United States Patent
Yoo

(10) Patent No.: US 8,658,113 B2
(45) Date of Patent: Feb. 25, 2014

(54) THIN FILM VALVE DEVICE AND ITS CONTROLLING APPARATUS

(75) Inventor: Jae Chern Yoo, Pohang (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 162 days.

(21) Appl. No.: 12/743,933

(22) PCT Filed: Nov. 11, 2008

(86) PCT No.: PCT/KR2008/006631
§ 371 (c)(1),
(2), (4) Date: May 20, 2010

(87) PCT Pub. No.: WO2009/066897
PCT Pub. Date: May 28, 2009

(65) Prior Publication Data
US 2010/0243078 A1    Sep. 30, 2010

(30) Foreign Application Priority Data

Nov. 22, 2007 (KR) .......................... 10-2007-0120586

(51) Int. Cl.
*B01L 99/00* (2010.01)
(52) U.S. Cl.
USPC ............. 422/537; 422/50; 422/500; 422/501; 422/502; 422/503; 422/504; 436/180
(58) Field of Classification Search
USPC ................... 422/50, 500–504, 537; 436/180
See application file for complete search history.

(56) References Cited

U.S. PATENT DOCUMENTS

| | | | |
|---|---|---|---|
| 6,302,134 B1 | 10/2001 | Kellogg | |
| 7,300,199 B2 | 11/2007 | Andersson et al. | |
| 7,459,129 B2 | 12/2008 | Andersson et al. | |
| 7,560,073 B1 | 7/2009 | Peters et al. | |
| 2001/0055812 A1 | 12/2001 | Mian et al. | |
| 2002/0106786 A1 | 8/2002 | Carvalho et al. | |
| 2002/0155010 A1* | 10/2002 | Karp et al. ................. | 417/413.2 |
| 2004/0063217 A1 | 4/2004 | Webster et al. | |
| 2004/0155213 A1 | 8/2004 | Yoo | |
| 2005/0026301 A1 | 2/2005 | Petithory | |
| 2006/0194273 A1 | 8/2006 | Thomas | |
| 2006/0291354 A1 | 12/2006 | Ferren et al. | |
| 2009/0163367 A1* | 6/2009 | Yoo ................................... | 506/7 |

FOREIGN PATENT DOCUMENTS

WO    WO 03080868    2/2003

OTHER PUBLICATIONS

U.S. Appl. No. 12/376,034, filed Feb. 2, 2009, Jae-chern Yoo, Samsung Electronics Co., Ltd.

* cited by examiner

*Primary Examiner* — Jyoti Nagpaul
(74) *Attorney, Agent, or Firm* — Staas & Halsey LLP

(57) ABSTRACT

Provided are a thin film valve device and a thin film valve control apparatus in which a hole or a channel in the body of the thin film valve device is opened and closed using the heat generated from a heat generating apparatus and the centrifugal force. The thin film valve device and the thin film valve control apparatus are applicable to, for example, a diagnostic lab-on-a-chip that can detect a trace amount of a material in a fluid, a rotatable bio-disc in which a bio chip, such as a protein chip and a DNA chip, is integrated, and the like.

46 Claims, 19 Drawing Sheets

FIG. 2
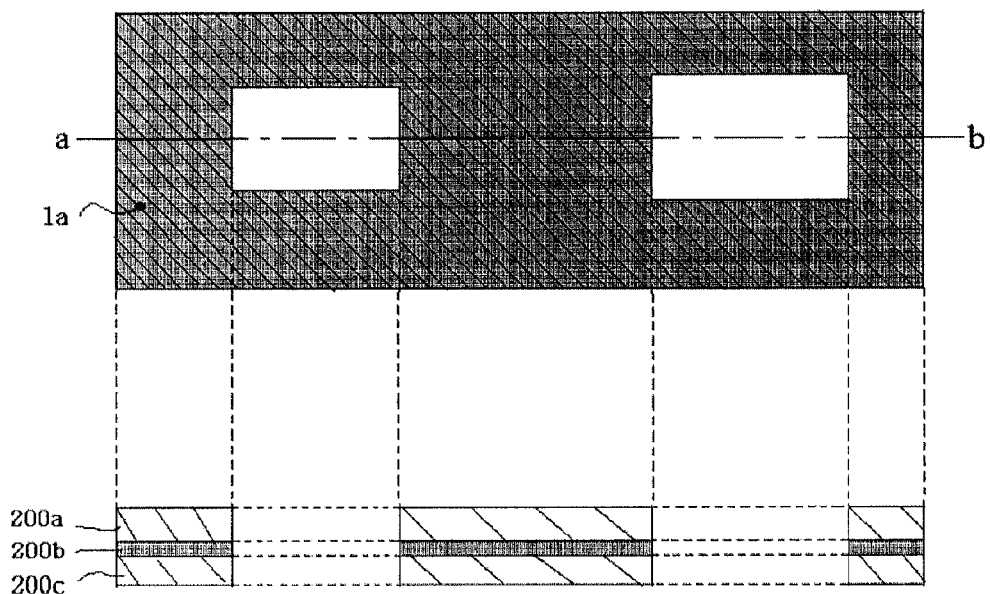
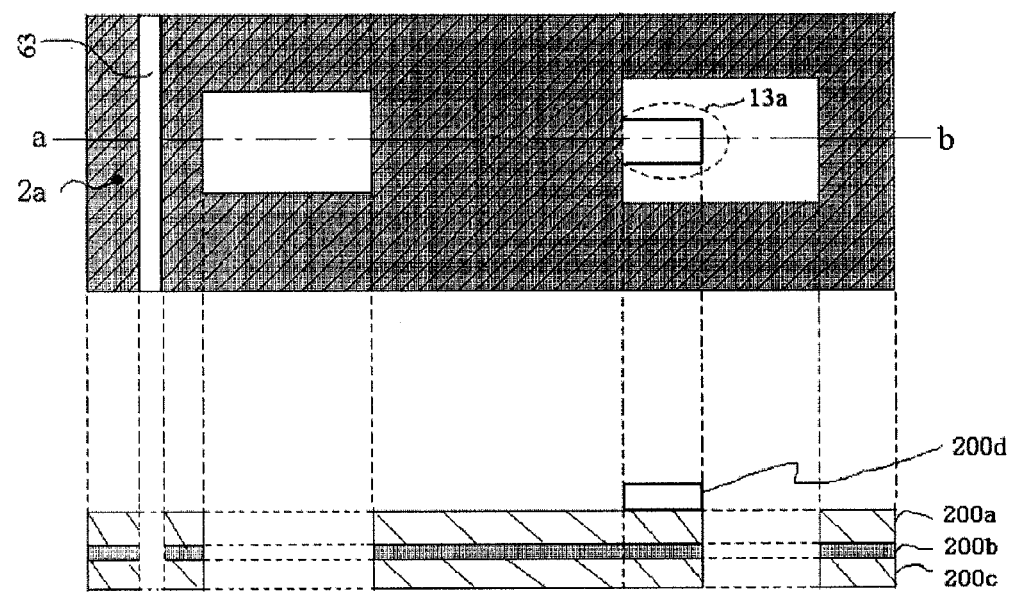

FIG. 5
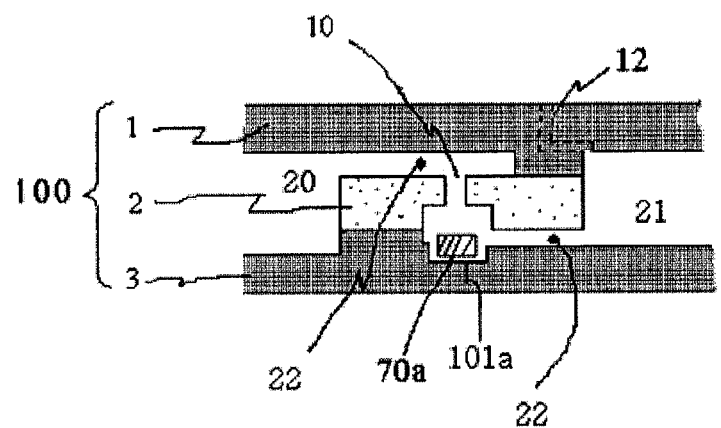
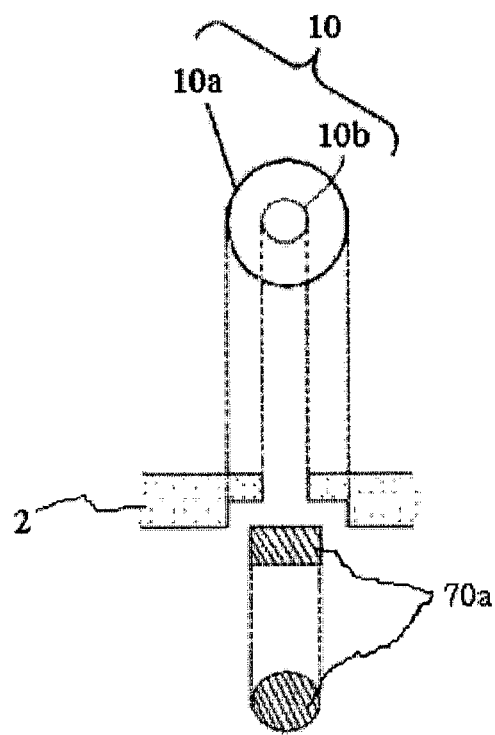

FIG. 18
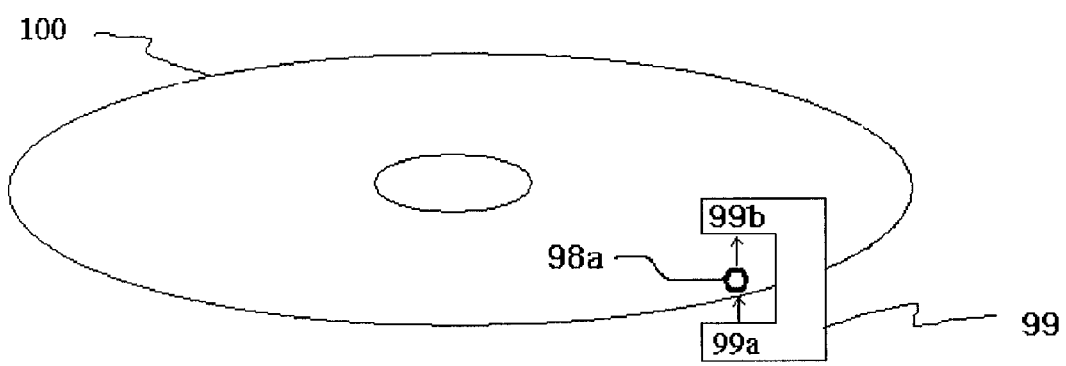
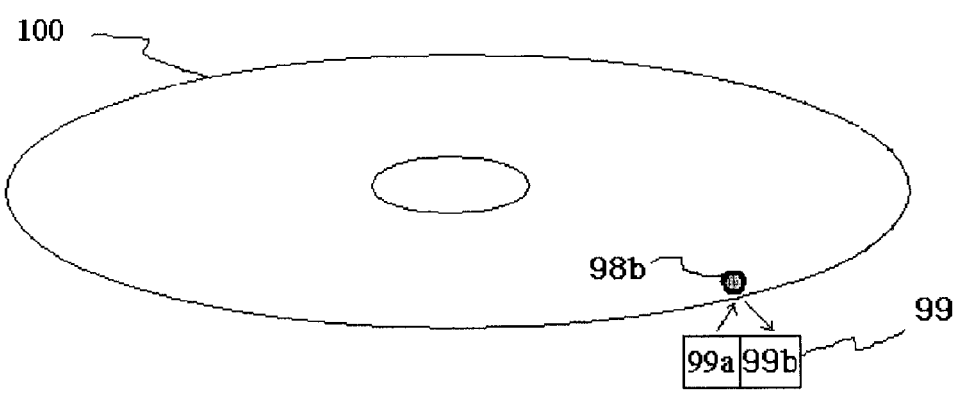

THIN FILM VALVE DEVICE AND ITS CONTROLLING APPARATUS

TECHNICAL FIELD

The inventive concept relates to controlling the flow and the flow rate of a fluid in a diagnostic assay device that can detect a trace amount of a material in the fluid.

The inventive concept relates to a thin film valve device for controlling the flow and the flow rate of a fluid and a thin film valve control apparatus, and more particularly, to a thin film valve device in which holes and valves are opened and closed due to the heat generated from a heat generating device and the centrifugal force, and a thin film valve control apparatus.

A thin film valve device and a thin film valve control apparatus according to an embodiment of the inventive concept are applicable in constructing valves and their control apparatus for a diagnostic lab-on-a-chip that can detect a trace amount of a material in a fluid and for a rotatable bio-disc in which a bio chip, such as a protein chip and a DNA chip, is integrated. For example, a thin film valve device and a thin film valve control apparatus according to an embodiment of the inventive concept are applicable in constructing a micro valve device by modifying a common disc device, such as a CD-ROM and a DVD, to be used to open and close channels and holes formed in a body formed as a thin film.

BACKGROUND ART

To date, for most diagnostic assay apparatuses for the detection of small quantities of analytes in fluids, multiple-sample preparation and automated reagent addition devices, or multiple-sample assay apparatuses for identifying a number of samples at the same time, either in parallel or serial procession, have been designed to improve efficiency and reduce costs. Such an automated reagent preparation device and an automated assay apparatus are often integrated into a single thin film type apparatus. This thin film type diagnostic assay apparatus can automatically or semi-automatically accurately analyze in an hour hundreds of analytes using trace amounts of a sample and reagents. The thin film type assay apparatus needs a valve for automatically supplying a sample or reagents (enzyme and buffer). However, designing such a valve for a thin film type assay apparatus is complicated. Therefore, there is a need to design a simple, thin film valve suitable for the thin film type assay apparatus.

For a CD and a DVD as a thin film substrate, a standard CD is formed from, for example, a 12 cm-polycarbonate substrate, a reflective metal layer and a protective lacquer coating. The format of a DVD, a CD, and a CD-ROM are described in the ISO 9660. The polycarbonate substrate is an optical-quality transparent polycarbonate substrate. A data layer in a DVD and a CD may be part of a polycarbonate substrate and data can be engraved in the form of a series of pits by a stamper in an injection molding process. The stamping master is mainly glass. Such a polycarbonate substrate may be modified as a thin film type diagnostic assay apparatus, such as a bio-disc, which detects a trace amount of a material in a fluid. In this case, in the injection molding process, instead of the pits, channels as fluid flow paths and chambers as buffer reservoirs may be formed, in a surface of the disc. Additionally, a thin film type valve that can smoothly control the flow and flow rate of the fluid through the channels formed in the thin film type disc is required.

Hereinafter, a diagnostic lab-on-a-chip detecting a trace amount of a material in a fluid, a disc in which thin film valves are integrated along with a bio chip such as a protein chip and a DNA chip, and a diagnostic disc in which thin film valves are integrated and biological and chemical processes are performed to detect a trace amount of a material in a fluid, are collectively called a "bio-disc" or "thin film valve device", wherein these devices are manufactured by modifying a common disc, such as a CD-ROM, a DVD, and the like.

A device for flowing a fluidic sample that is injected into an injection hole of the disc in a surface of the disc using the centrifugal force and a device for flowing a fluidic sample that is injected into an injection hole of the disc into a channel and a chamber using the centrifugal force to separate the sample are widely known. However, these devices could not overcome a difficulty of constructing a thin film type structure, and thus do not ensure precise control of the flow rate.

A general valve using an electromagnet opens or closes a channel using a cylinder or a plunger that is moved due to a magnetic force. To intensify the magnetic force so as to move the cylinder or plunger, a ferroelectric core of an appropriate size and a number of wires wound around the core are required. Also, a large amount of electricity is required to turn on or off the valve and move the cylinder or plunger. The valve using the electromagnet cannot be constructed as a thin film type valve due to the size of the electromagnet. The valve generates excess heat as a result of consuming a large amount of electricity. Thus, the valve is not suitable to be a thin film valve To address these problems, in an embodiment of the inventive concept, valves are opened using the centrifugal force generated as the thin film valve device rotates, in addition to using the heat generated from a heat generating apparatus. As a result, the volume of external magnets is reduced, and the reliability of opening the valves is ensured. In addition, the fluid does not contact the valves as holes, instead of channels, are opened. Thus, the properties of the fluid are less likely to be changed as the heat is generated.

A bio-disc is required to store liquid-phase materials in a chamber to be stable throughout the period of circulation. However, the body of the bio-disc shrinks and expands for a long period of circulation due to environmental factors such as temperature, which may lead to a gap in the valve. As a result, the fluid stored in the chamber evaporates through the gap in the valve, which lowers the reliability of sealing of the valve. To solve this problem, an embodiment of the inventive concept provides a thin film valve device that closes and opens the hole as follows. A bead (ball) stopple, a nonmagnetic stopple, a magnetic stopple, or a heat shrinkable stopple, which are coated with an adhesive (a gluing agent), or a thin film adhesive tape is attached to the hole to tightly close the hole for the period of circulation. In addition, when opening the hole, the adhesive strength (binding force) of the adhesive is lowered using the heat generated from the heat generating apparatus, and then the bead (ball) stopple, the nonmagnetic stopple, the magnetic stopple, the heat shrinkable stopple, or the thin film adhesive tape is separated from the hole using the hydraulic force of the fluid, which is generated due to the centrifugal force.

Hereinafter, the bead (ball) stopple, the nonmagnetic stopple, the magnetic stopple, the heat shrinkable stopple, and a hole closing film formed by the thin film adhesive tape, which are used to open and close the hole, are collectively referred to as thin film valves.

The thin film valves are formed as thin films. In addition, the adhesive used as a coating agent for the thin film valves is flexible to adapt to the expansion and shrinking of the body of the thin film valve device according to environmental factors such as temperature, thereby preventing the problem of sealing, which is caused due to the expansion and shrinking of the body, during the period of circulation.

A thin film valve device according to an embodiment of the inventive concept includes valves in the form of thin films. In addition, a larger number of valves may be integrated in a unit area. Thus, the thin film valve device is applicable in constructing valves for a thin film diagnostic device, such as a lab-on-a-chip or a DNA chip, which can detect a trace amount of a material in a fluid. For example, the thin film valve device is applicable in constructing a valve device by modifying a common disc device, such as a CD-ROM, a DVD, and the like, to open and close a channel and a hole in the body of the thin film valve device or to control the flow rate of a fluid.

DETAILED DESCRIPTION OF THE INVENTIVE CONCEPT

Technical Problem

A thin film valve device and a thin film valve control apparatus according to an embodiment of the inventive concept are applicable in constructing valves and their control apparatus for a diagnostic lab-on-a-chip that can detect a trace amount of a material in a fluid and for a rotatable bio-disc in which a bio chip, such as a protein chip and a DNA chip, is integrated.

Technical Solution

An embodiment of the inventive concept includes a thin film valve device that opens a hole closed by bead (ball) stopple, a heat shrinkable stopple, a nonmagnetic stopple, or a magnetic stopple using a heat generated from a heat generating apparatus and the centrifugal force.

Another embodiment of the inventive concept includes a thin film valve device that opens a hole closed by a magnetic stopple using a heat generated from a heat generating apparatus, the centrifugal force, and/or a magnetic force.

Another embodiment of the inventive concept includes a thin film valve device having a reversible opening/closing function that involves: opening the hole closed by the magnetic stopple by weakening the adhesive strength of the magnetic stopple using the heat generated from the heat generating apparatus and then by using a moveable permanent magnet located under the body; and closing the hole again by restoring the adhesive strength of the magnetic stopple using the heat generated from the heat generating apparatus, and simultaneously by using an attraction force between a permanent magnet disposed over the hole and the magnetic stopple.

Another embodiment of the inventive concept includes a thin film valve device that opens a hole or channel closed by a heat shrinkable stopple using the heat generated from the heat generating apparatus.

According to another embodiment of the inventive concept, a surface of the bead (ball) stopple, the heat shrinkable stopple, the magnetic stopple and the nonmagnetic stopple may be coated with an adhesive.

Hereinafter, throughout the specification of the inventive concept, an adhesive, a thin film adhesive tape, and a tape are interchangeably used.

Another embodiment of the inventive concept includes a thin film valve device in which the hole is closed by a hole closing film formed of a thin film adhesive tape and is opened as the hole closing film ruptures due to the hydraulic force (or hydraulic pressure) of the fluid itself that is generated due to the heat from the heat generating apparatus and the centrifugal force.

The heat generating apparatus may comprise a local UV illumination unit, a UV light source, and a laser beam generating apparatus.

The bead (ball) stopple may be selected from the group consisting of a ferromagnetic bead, a paramagnetic bead, a diamagnetic bead, a metallic ball, a metal-coated plastic bead, and a glass bead. The bead stopple may have a diameter of 1 um to 1 mm. The bead stopple and the heat shrinkable stopple may have either spherical particles or non-spherical particles. Examples of spherical particles include thin film cylindrical particles, cylindrical particles, or thin film quadrilateral particles.

The thin film adhesive tape may contain an adhesive used in any adhesive tape, such as a single-sided tape, a double-sided tape, etc. The adhesive may be a material, such as a hot melt adhesive, a silicon adhesive, a rubber-based adhesive, a modified silicon-based adhesive, an acrylic adhesive, a polyamide adhesive, a polyolefin adhesive, a Teflon-based adhesive, an epoxy adhesive, a UV curable adhesive, a UV adhesive, a thermoplastic resin, a gel, a wax, and the like.

For example, the adhesive may be a hot melt tape, a thermosetting tape, or a thermoplastic tape. The gel may be polyacrylamides, polyacrylates, polymethacrylates, or polyvinylamides. The thermoplastic resin may be COC, PMMA, PC, PS, POM, PFA, PVC, PP, PET, PEEK, PA, PSU, or PVDF. The wax may be a paraffin wax, a synthetic wax, or a microcrystalline wax. The adhesive may melt or may lose its adhesive strength due to the heat generated from the heat generating apparatus. The hot melt tape, the thermoplastic tape, or the UV curable adhesive may melt due to the heat generated from the heat generating apparatus and lose the adhesive strength. The adhesive may further include a plurality of micro-sized heat generating particles that generate heat by absorbing energy generated from the heat generating apparatus. The plurality of micro-sized heat generating particles that have generated heat due to the irradiation from the heat generating apparatus may facilitate the melting and swelling of the adhesive, and thus weaken the adhesive strength of the adhesive. The micro-sized heat generating particles may be particles of at least one selected from between a ferromagnetic material and a metal oxide. The ferromagnetic material may be at least one selected from the group consisting of Fe, Ni, Cr, and an oxide of these elements. The metal oxide may be selected from the group consisting of $Al_2O_3$, $TiO_2$, $Ta_2O_3$, $Fe_2O_3$, $Fe_3O_4$, and $HfO_2$. The single-sided tape or the double-sided tape may be formed by coating a surface or both surfaces of paper, vinyl, a polyester film, a polyethylene film, a polyethylene terephthalate (PET) film, or a synthetic backing with a special adhesive (a gluing agent). Adhesive materials with high sealing and buffering abilities, a vibration relief effect, shock tolerance, heat resistance, adsorption ability, adhesive strength, and the like may be selected for use according requirements. The heat shrinkable stopple may be a material selected from among a Teflon-based material, a silicon-based material, and a polyolefin-based material. The heat shrinkable material may have an elasticity of 50% to 350%.

Another embodiment of the inventive concept includes a thin film valve device comprising: at least one chamber that stores a fluid required for biological, biochemical or chemical assay and in which a biological, chemical, biochemical reaction is performed; a channel that connects the at least one chamber; an assay site or a biochemical reaction chamber in which a sample is subjected to a biological, chemical or biochemical reaction; a hole that is located in the middle of the channel and interconnects the channel; a thin film valve than opens and closes the hole; and a body in which the at least one chamber, the channel, the assay site, the biochemical reaction chamber, the hole, and the thin film valve are integrated.

The biological, chemical or biochemical reaction may refer to a specific binding reaction, a ligand-receptor reaction, an antigen-antibody reaction, an immunological reaction, a hybridization reaction or a biochemical reaction between two bio materials, or a change in three-dimensional structure according to the reaction. The biochemical reaction may include reactions for assaying GOT, GPT, ALP, LDH, GGT, CPK, amylase, T-protein, albumin, glucose, T-cholesterol, triglycerides, T-bilirubin, D-bilirubin, BUN, creatinine, I-phosphorus, calcium, uric acid, and the like in blood.

The thin film valve device according to the current embodiment of the inventive concept may be applicable to a diagnostic assay device for detecting a trace amount of a biological or chemical material in a fluid, for example, a lab-on-a-chip in which an ELISA/CLISA assay method is applied, a lab-on-a-chip in which a rapid test method is applied, or a lab-on-a-chip for examinations of food poisoning germs, remaining antibiotics, remaining agrichemicals, heavy metals in polluted water, genetically modified foods, food allergies, polluted materials, bacteria such as coliforms and salmonellas, confirmation of biological children, types of meat, and identification of an origin.

The bacteriological examination includes examinations of coliforms, pseudomonas aeruginosa, staphylococcus, vibrios, and salmonellas. The examination of remaining agrichemicals may include examination of organophosphate and carbamate insecticides which are most widely used among agrichemicals for vegetables and fruits. The bio materials (samples) may include one or more selected from among DNA, oligonucleotide, RNA, PNA, ligand, receptor, antigen, antibody, milk, urine, saliva, hair, crops and vegetable samples, meat samples, fish samples, bird samples, polluted water, domestic animal samples, food materials, food samples, mouth cells, tissue cells, semen, protein, and other bio materials. The food materials may include materials used to prepare foods, and may include, for example, materials for stew, materials for noodles, materials for kimchi, materials for soup, and liquid-containing food materials. When urine is examined, the thin film valve device may assay leucocyte, blood, protein, nitrile, pH, specific gravity, glucose, ketone, ascorbic acid, urobilinogen, and bilirubin. When hair is examined, the historical record resulting from the accumulation of nutrients and poisonous materials in a human body, including minerals, can be more accurately measured compared to blood or urine assays. Also, excess and lack of inorganic materials for a long period can be accurately known, and it can be used as a sample to find the amounts of poisonous heavy metals.

The body of the thin film valve device may comprise a circular disc having a diameter of 120 mm, 80 mm, 60 mm, or 32 mm.

According to another embodiment of the inventive concept, the body of the thin film valve device may be formed by stacking two or three substrates upon one another and binding the substrates together.

According to another embodiment of the inventive concept, the body may be formed by stacking an upper substrate, an intermediate substrate and a lower substrate upon one another and binding together, and channels, holes, and chambers may be formed in the body. For example, one chamber and an upper channel connecting the chamber and the hole may be formed recessed to a depth in the upper substrate, and the other chamber and a lower channel connecting the chamber and the hole may be formed recessed to a depth in the lower substrate. The hole may be formed in the intermediate substrate.

According to another embodiment of the inventive concept, the channel may be a thin film channel. The thin film channel may be formed by a thin film adhesive tape, instead of being formed recessed.

According to another embodiment of the inventive concept, the thin film channel may be formed between the layers of substrates by a thin film adhesive tape having a channel pattern. The substrates are bound together into a single body using a thin film adhesive tape. In this case, the thin film channel may be formed in the regions between the substrates where the thin film adhesive tape is not attached. The thin film channel may be formed to be narrow, which may induce a capillary phenomenon making easier for the fluid to flow.

According to another embodiment of the inventive concept, the body may further include a ventilating hole through which air is ventilated to allow smooth flow of the fluid. In this case, the ventilating hole may be formed in an opposite direction to the direction in which the fluid flows or the centrifugal force is exerted.

According to another embodiment of the inventive concept, the body may further include a confining groove or a confining channel to prevent the bead stopple, the heat shrinkable stopple, the nonmagnetic stopple, or the magnetic stopple from freely moving away from the hole.

According to another embodiment of the inventive concept, the body may be formed of a material selected from the group consisting of silicon, plastic, aerogel, polymethyl methacrylate (PMMA), glass, polypropylene, polyacrylate, polyvinylalcohol, polyethyelene, a cyclic olefin copolymer (COC), and polycarbonate.

According to another embodiment of the inventive concept, the body may be formed of silicon, polypropylene, COC, or polycarbonate. In addition, a surface of the body may be coated with aluminum or an aluminum sheet to prevent evaporation of the fluid stored in the chambers.

According to another embodiment of the inventive concept, channels and a hole may be formed between adjacent chambers in the body. The hole may be closed by the thin film valve, and may be opened by weakening the adhesive strength of the thin film valve using the heat generated from the heat generating apparatus and then by using the centrifugal force generated as the body rotates.

According to another embodiment of the inventive concept, channels and a hole may be formed between adjacent chambers in the body. The hole may be closed by the thin film valve, and may be opened by weakening the adhesive strength of the thin film valve using the centrifugal force generated as the body rotates and the heat generated from the heat generating apparatus.

According to another embodiment of the inventive concept, channels and a hole may be formed between adjacent chambers in the body. The hole may be closed by the thin film valve, and may be opened by weakening the adhesive strength of the thin film valve using the heat generated from the heat generating apparatus or using the heat generated from the heat generating apparatus and the centrifugal force, and then by using an attraction force between the magnetic stopple and a moveable permanent magnet located under the body. The magnetic stopple may be a permanent magnet.

According to another embodiment of the inventive concept, the thin film adhesive tape may be coated as a thin film adhesive on a surface of the substrate by attaching a single-sided tape (or double-sided tape) on the surface of the substrate and removing a protective strip. Alternatively, the thin film adhesive may be coated on a surface of the substrate by printing an adhesive using a disperser, spray or silk screen. In other words, the thin film adhesive tape refers to an adhesive itself (a gluing agent) and may be coated on the substrate with the adhesive. The thin film adhesive tape may include a hole closing film so that the hole closing film may remain around the hole after the protective strip is removed. The hole closing film is formed around the hole and closes the hole when the substrates are bound together into a single body.

According to another embodiment of the inventive concept, a plurality of substrates on which the adhesive is coated as thin films may be bound together into a single body.

According to another embodiment of the inventive concept, a plurality of heat generating apparatuses may be installed in the body to correspond to the thin film valves, respectively. The heat generating apparatus installed near the hole of the body may be a hot-wire or a metallic heat generating element, which are manufactured based on the resistance characteristics of materials.

According to another embodiment of the inventive concept, the heat shrinkable material may be shaped in a cylindrical form. The heat shrinkable material may shrink due to the heat generated from the heat generating apparatus so that the hole or the channel is opened.

Another embodiment of the inventive concept provides a thin film valve control apparatus that opens and closes valves of the thin film valve device using the centrifugal force and the heat generated from a heat generating apparatus. The thin film valve control apparatus comprises: a spindle motor that rotates the thin film valve device; a slider that spatially moves the heat generating apparatus, which is mounted on the slider; and a slider motor that controls movement of the slider.

The heat generating apparatus mounted on the slider may be a laser beam generating apparatus or a light emitting diode (LED) light source. The heat generating apparatus is mounted on the slider. The movement of the heat generating apparatus with respect to the thin film valve in a radial direction may precede the movement in other directions. A permanent magnet on which an attraction force with the magnetic stopple is exerted may be further mounted on the slider. The laser beam generating apparatus, which is mounted on the slider, may spatially move in the radial direction and then generate a pulse beam or a continuous beam to weaken the adhesive strength of the adhesive. The laser beam generating apparatus, which is mounted on the slider, may spatially move in the radial direction and then generate a pulse beam or a continuous beam to shrink the heat shrinkable stopple. The laser beam generating apparatus, which is mounted on the slider, may spatially move in the radial direction and then weaken the adhesive strength of the adhesive by controlling a duty of the pulse beam, the intensity of the continuous laser beam, or the rotation speed of the thin film valve device while the laser beam is radiated. When the thin film valve device rotates and the laser beam generating apparatus, which is mounted on the slider, corresponds to a specific thin film valve, the laser beam is irradiated onto the thin film valve. The amount of the laser beam irradiated onto the thin film valve is a function of the rotation speed of the thin film valve device and the intensity of the laser beam. Hereinafter, the operation of periodically radiating the laser beam onto the thin film valves while the thin film valve device rotates is referred to as "pulse beam" operation. The pulse beam operation is applicable when moving a fluid having a high viscosity into a corresponding chamber due to the centrifugal force generated as the thin film valve device rotates. A fluid having a high viscosity, such as blood plasma, tends to hardly flow even when the thin film valve is opened. In this case, if the hole is opened while rotating the thin film valve device, the fluid may move easily due to the centrifugal force. In the state where the thin film valve device stops, when radiating a laser beam onto a thin film valve after the laser beam generating apparatus, which is mounted on the slider, is aligned to face the corresponding thin film valve, the amount of the laser beam irradiated onto the thin film valve is a function of the intensity of the laser beam and the duration of irradiation. In this case, the intensity of the laser beam may be varied by controlling the focal point of the laser beam, the distance between the laser beam generating apparatus and the thin film valve, the amount of current in the laser beam generating apparatus, or the on-off duty of the laser beam. Hereinafter, the operations of aligning the laser beam generating apparatus and the thin film valve and irradiating the laser beam to weaken the adhesive strength (binding force) of the thin film valve in the state where the thin film valve device stops rotating is referred to as "scanning beam" operation. The heat generated from the heat generating apparatus may be supplied to the thin film valve through the "pulse beam" or "scanning beam" operation.

Advantageous Effects

As described above, the one or more embodiments of the inventive concept provides a thin film valve device using a stopple coated with an adhesive, a heat shrinkable material, or a thin film adhesive tape to control the flow or the flow rate of a fluid, and a thin film valve control apparatus for controlling the thin film valve device. In the thin film valve device, a hole and a channel in the body of the thin film valve device may be opened and closed due to the heat generated from the heat generating apparatus and the centrifugal force. For example, the thin film valve device is applicable to a diagnostic lab-on-a-chip for detecting a trace amount of a material in a fluid, a rotatable bio-disc in which a bio chip, such as a protein chip or a DNA chip, is integrated. For example, a thin film valve device and a thin film valve control apparatus according to an embodiment of the inventive concept may be a micro valve device and a control apparatus therefore that are manufactured by modifying a common disc device, such as a CD-ROM and a DVD, to be used to open and close channels and holes.

DESCRIPTION OF THE DRAWINGS

FIGS. 1 through 3 illustrate an embodiment of a thin film valve device using a thin film adhesive tape.

FIGS. 4 and 5 illustrate the operation state of thin film valve devices according to embodiments of the inventive concept that use a heat shrinkable stopple.

FIGS. 17 through 20 illustrate embodiments of a thin film valve control apparatus for controlling the operation of the thin film valve device.

BRIEF EXPLANATION OF MAIN ELEMENTS IN THE DRAWINGS

Figure 1:
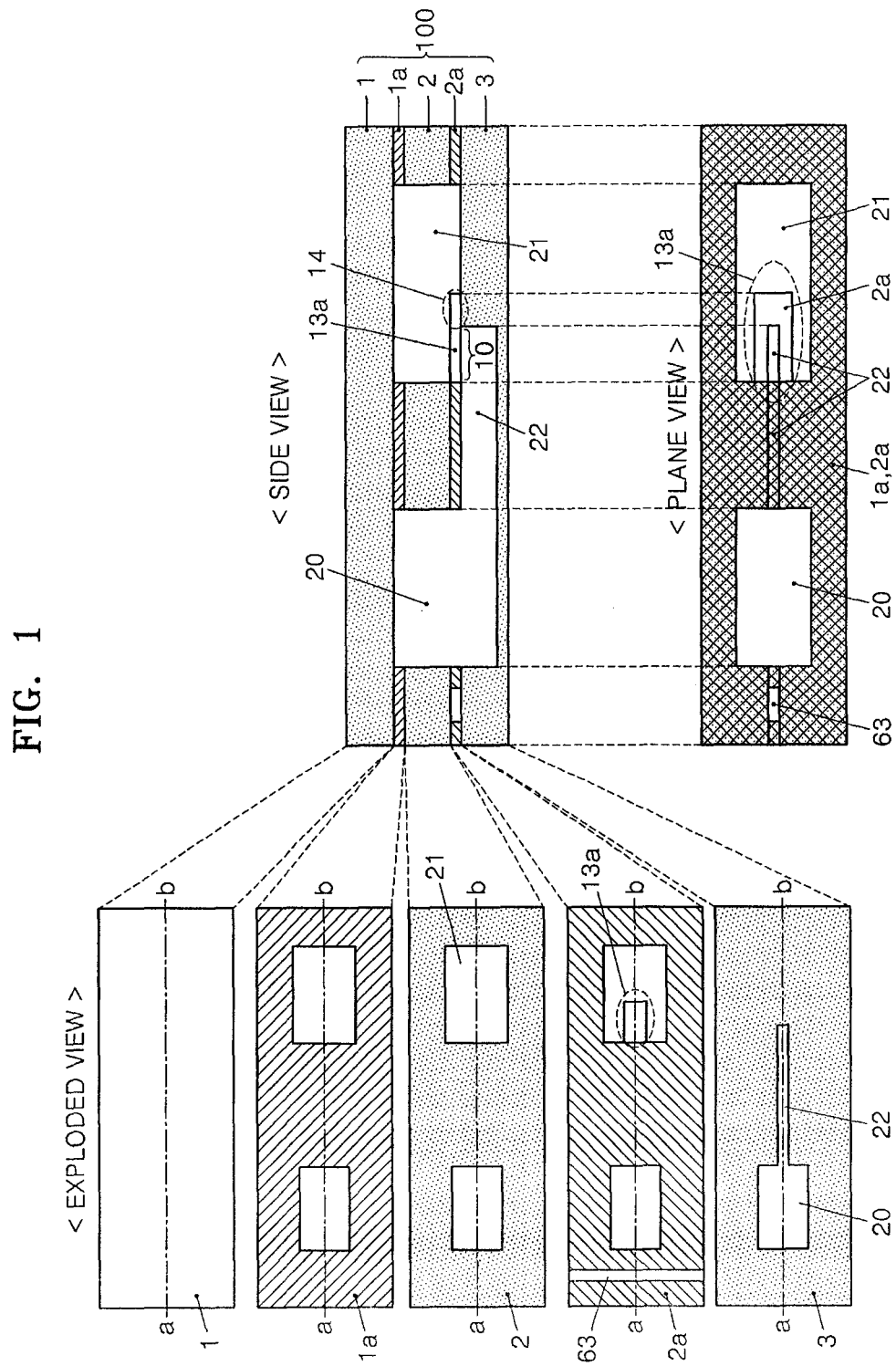

1: upper substrate; 1a,1b,2a: thin film adhesive tape layer
2: intermediate substrate; 2a: thin film adhesive tape layer 3: lower substrate; 4a,4b,4c,5a: permanent magnet
10,10a,10b: hole; 10c: bead (ball) channel; 12: ventilation hole
13a,13b: hole closing film; 20,21: chamber; 22: channel; 23: auxiliary channel; 60: bead (ball) stopple
61b: bead (ball); 70a: heat shrinkable stopple; 70b: nonmagnetic stopple; 70c: magnetic stopple; 80: adhesive
81: nonmagnetic or magnetic material; 82: donut-hole; 98a: reference hole; 98b: reference reflector
99: photodetector (or azimuth angle detector); 99a,99b: photo-coupler
100: body of thin film valve device; 100a: thin film valve control apparatus; 101: central control unit
102: spindle motor; 101a,101b,101c: confining groove; 102a: pressure jaw; 103: up/down motion control unit
104: compression element; 107: heat generating apparatus (or laser beam generating apparatus); 108: illuminating unit; 108a,108b: slide arms; 109: slide motor; 109a,109b: worm gear connection unit
110: radio frequency generation unit; 110a: wafer or harness; 110b: flexible cable
110a,110b,110c,110d: screw (110a, 110b are designated for different elements); 111: input/output unit
121: sample injection hole; 140: circuit board; 170: aperture; 181: turntable
130,131,132,133,140,141,142,143: chamber
188: wireless RF IC with built-in memory; 189: solar battery
200a,200c: thermosetting adhesive layer; 200d: thermoplastic adhesive layer; 200b: PET backing
211: slider; V1,V2,V3,V4,V5,V6,V7: valves; 300: body of thin film valve control apparatus

BEST MODE

Hereinafter, the inventive concept will be described in greater detail with reference to the appended drawings.

Figure 3:
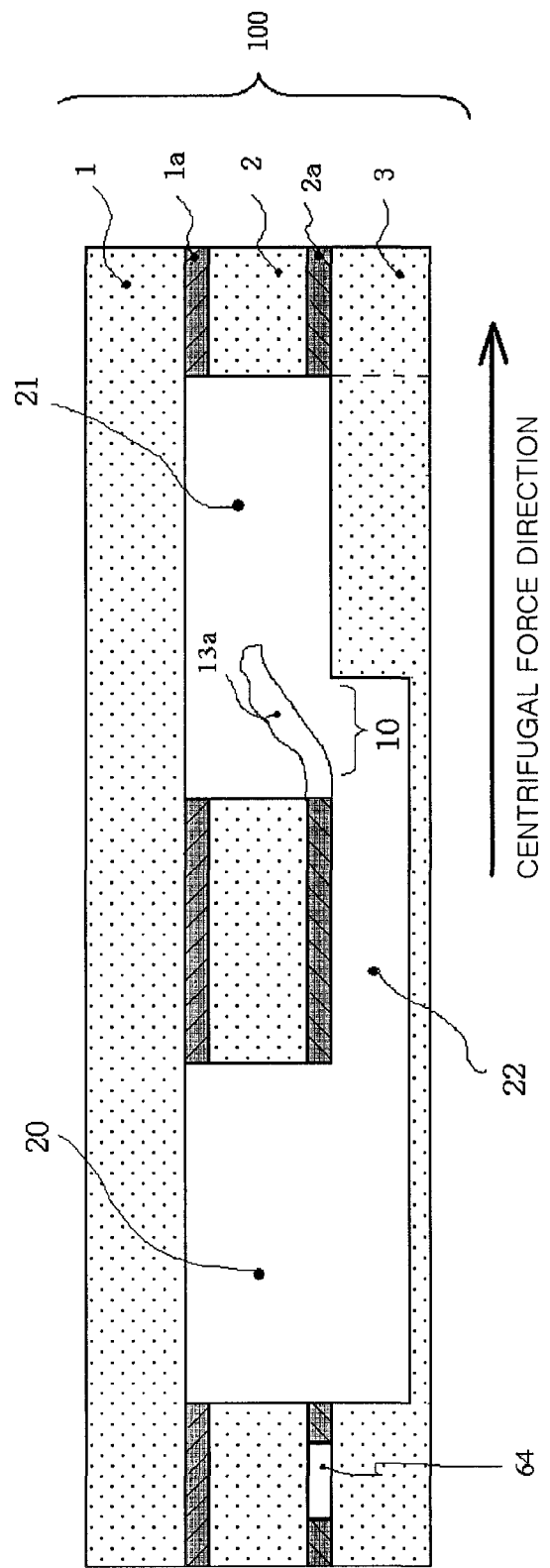

FIGS. 1 through 3 illustrate an embodiment of a thin film valve device using a thin film adhesive tape.

FIG. 1 is sectional and exploded views cut along line a-b, which illustrate a thin film valve in a body 100 of the thin film valve device, wherein the thin film valve is formed by the thin film adhesive tape. The body 100 may include an upper substrate 1, an intermediate substrate 2, and a lower substrate 3. When the upper substrate 1, the intermediate substrate 2, and the lower substrate 3 are formed by injection molding, channels 22 as flow paths, chambers 20 and 22 as buffer reservoirs, and a hole 10 connecting the channels 22 may be formed. The upper substrate 1, the intermediate substrate 2, and the lower substrate 3 may be bound together using thin adhesive tape layers to form a single body 100. For example, the lower substrate 3 and the intermediate substrate 2 form the chambers 20 and 21. In the lower substrate 3, the channel 22 connecting the chambers 20 and 21 are formed recessed to a depth. The hole 10 connecting the chambers 20 and 21 may be formed in an end portion of the channel 22. The hole 10 may be closed by a hole closing film 13a. The hole closing film 13a may be formed around the hole 10 by the thin film adhesive tape 10 when the upper substrate 1, the intermediate substrate 2 and the lower substrate 3 are bound together in an assembling process.

In the thin film valve device according to the current embodiment of the inventive concept, the hole closing film 13a may be a thermoplastic adhesive, and a substrate binding portion of each substrate, which excludes the hole closing film 13a, may be formed as the thin film adhesive tape layer using a thermosetting adhesive.

In the thin film valve device according to the current embodiment of the inventive concept, the hole closing film 13a may be a thin film adhesive tape layer formed of a hot-melt adhesive, and the substrate binding portion of each substrate may be formed as the thin film adhesive tape layer using an acrylic adhesive.

In the thin film valve device according to the current embodiment of the inventive concept, the thermosetting adhesive may have a softening temperature of 120 degree or higher, and the thermoplastic adhesive may have a softening temperature of 60 to 80 degrees.

In the thin film valve device according to the current embodiment of the inventive concept, the adhesive forming the hole closing film 13a may have a softening point that is lower than the softening point of the adhesive forming the remaining substrate binding portion of each substrate. The hole closing film 13a may be a thermoplastic tape, and the remaining substrate binding portion of each substrate may be formed as a thin film adhesive tape layer using a thermosetting tape material. Thus, when binding the upper substrate 1, the intermediate substrate 2, and the lower substrate 3 together, the three substrates may be heated or pre-heated as a whole to a temperature that is equal to or higher than the softening temperature of the thermoplastic tape. In this case, since the softening point of the thermosetting tape is far higher than the softening point of the thermoplastic tape, binding the substrate binding portions using the thermosetting tape may be performed irrespective of heating. The hole closing film 13a is likely to soften easily due to the heat generated from the heat generating apparatus and its adhesive strength weakens, whereas its neighboring portions and the remaining substrate binding portions are bound by the thermosetting tape, and thus their adhesive strength may not weaken due to the heat generated from the heat generating apparatus. Since the hole 10 is closed by the hole closing film 13a, the hole 10 can be completely closed throughout the period of circulation. When using the thin film valve device, the hole closing film 13a ruptures due to the heat generated from the heat generating apparatus, the centrifugal force generated as the body 100 rotates at a high speed, and the hydrostatic force of the fluid stored in the chamber 20, so that the hole 10 is opened and the fluid can move into the chamber 21. The hole closing film 13b is flexible, and thus can expand and shrink in response to environmental factors, such as temperature. Thus, a problem, such as evaporation of the fluid, which may be caused due to a sealing problem, may not occur during the period of circulation.

In the thin film valve device according to the current embodiment of the inventive concept, the hole closing film 13b may be formed around the hole 10 as the upper substrate 1, the intermediate substrate 2 and the lower substrate 3 are bound using the thin film adhesive tape layers 1a and 2a in the assembling process.

FIG. 2 illustrates examples of the thin film adhesive tape layers 1a and 1b of FIG. 1.

In the examples of FIG. 2, the thin film adhesive tape layers 1a and 1b may be formed by coating upper and lower surfaces of a polyethylene terephthalate (PET) film or backing 200b with thermosetting adhesive layers 200a and 200c, respectively. Reference numeral 200a denotes the thermosetting adhesive layer coated on the upper surface of the PET film 200b, and reference numeral 200c denotes the thermosetting adhesive layer coated on the lower surface of the PET film 200b. The hole closing film 13a may be formed by additionally coating a thermoplastic adhesive layer 200d on the thermosetting adhesive layer 200d formed on the upper surface of the PET film 200b.

In the thin film valve device according to the current embodiment of the inventive concept, the thermoplastic adhesive layer 200d for the hole closing film 13a may be formed through silk screen printing, a disperser process, or spray printing with a mask pattern exposing a portion to be the hole closing layer 13a. The mask pattern may have an opening exposing only the portion to be the hole closing film 13a. Reference numeral 63 denotes a thin film channel formed by the thin film adhesive tape.

Figure 4:
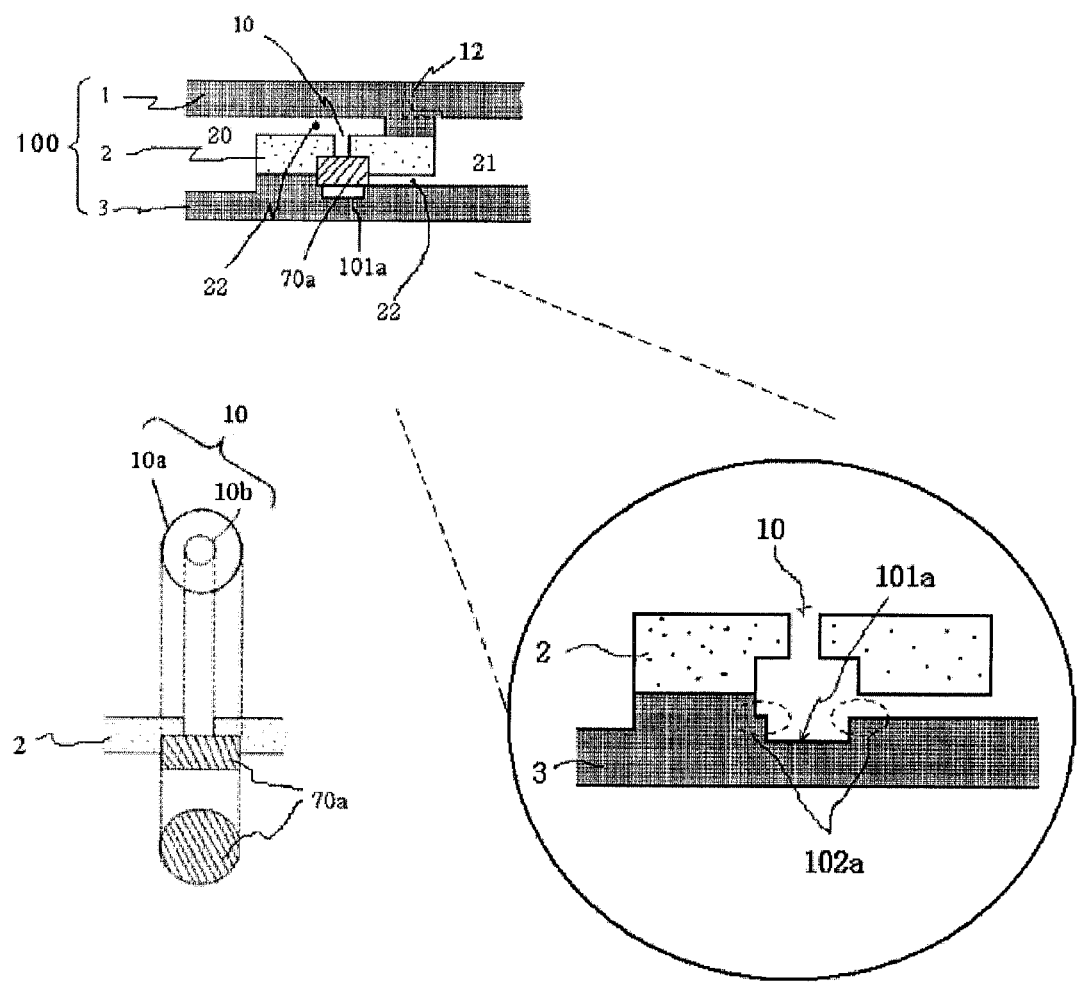

FIG. 3 illustrates a state where the hole closing film 13a rupture due to the centrifugal force generated as the body 100 rotates, the hydrostatic force of the fluid itself (not shown), and the heat generated from the heat generating apparatus so that the hole 10 is opened and the fluid stored in the chamber 20 moves into the chamber 21. FIGS. 4 and 5 are sectional views illustrating operation states of the thin film valve device according to the current embodiment of the inventive concept. Reference numerals 1, 2 and 3 denote substrates constituting the body 100. The body 100 may include the upper substrate 1, the intermediate substrate 2, and the lower substrate 3. When the upper substrate 1, the intermediate substrate 2, and the lower substrate 3 are formed by injection molding, the channel 22 as a flow path, the chambers 20 and 22 as buffer reservoirs, and the hole 10 connecting the channel 22 may be formed. The upper substrate 1, the intermediate substrate 2, and the lower substrate 3 are bound together to form a single body 100.

FIG. 4 illustrates the state where the hole 10 is plugged by a heat shrinkable stopple 70a so that the channel 22 is blocked. FIG. 5 illustrates the state where the heat shrinkable stopple 70a shrinks due to the heat generated from the heat generating apparatus so that the hole 10 is opened. In this case, the adjacent chambers 20 and 21 may be interconnected through the channel 22. In addition, in the thin film valve device according to the current embodiment of the inventive concept, since the channel 22 formed in the body 100 is narrow, a ventilation hole 12 is formed in the upper substrate 1 to allow the fluid to smoothly flow through the channel 22 without resistance. In addition, a confining groove 101a may be formed to confine the heat shrinkable stopple 70a to be pushed to contact the lower substrate 3 when the hole 10 is opened. The confining groove 101a may provide a movable space to the heat shrinkable stopple 70a to prevent the hole 10 that has been opened from being closed by the heat shrinkable stopple 70a.

In the current embodiment of the inventive concept, the confining groove 101a may have a diameter that is 20%-70% greater than the diameter of the heat shrinkable stopple 70a that has shrunk.

In the current embodiment of the inventive concept, the confining groove 101a may further include a pressure jaw 102a along the rim of the confining groove 101a, which has a smaller diameter than the original diameter of the heat shrinkable stopple 70a that has not shrunk. When the body 100 is assembled, the heat shrinkable stopple 70a is pushed into an outer hole 10a due to the pressure jaw 102a formed in the lower substrate 3 so that the heat shrinkable stopple 70a closes the hole 10a. Reference numeral 10 denotes a region where the heat shrinkable stopple 70a and the intermediate substrate 2 contact each other. This contact region is shaped to correspond to the shape of the heat shrinkable stopple 70a to prevent a leakage of the fluid when the hole 10 is closed. Thus, the hole 10 can be closed due to the pressure jaw 102 as an external pressure is applied in a process of manufacturing the thin film valve device.

Reference numeral 10a denotes an outer margin ("outer hole") of the contact region between the heat shrinkable stopple 70a and the intermediate substrate 2, and reference numeral 10b denotes an inner margin ("inner hole") of the contact region. It is more likely to prevent the leakage of the fluid as the contact region between the outer hole 10b and the heat shrinkable stopple 70a is larger. As a difference between the diameters of the outer hole 10b and the inner hole 10a is larger, the contact area between the heat shrinkable stopple 70a and the intermediate substrate 2 becomes larger so that the leakage of the fluid can be prevented.

In another embodiment of the inventive concept, the heat shrinkable stopple 70a may have a diameter of 0.1 mm to 5 mm and a thickness of 0.5 mm to 2 mm. In addition, in order to enhance the sealing capacity of the heat shrinkable stopple 70a when it closes the hole 10, the heat shrinkable stopple 70a may be coated with an adhesive.

Figure 6:
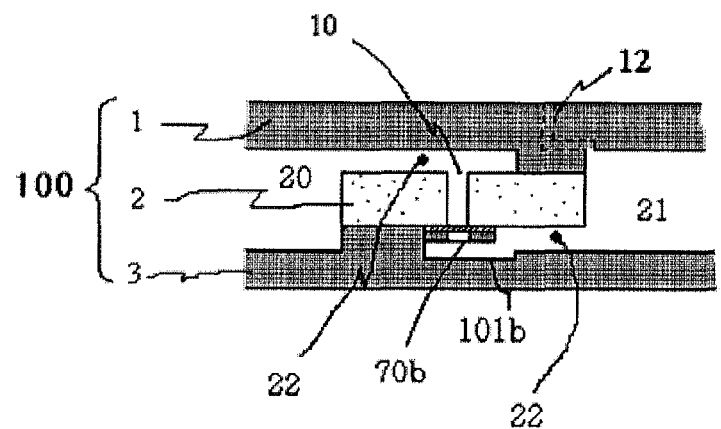
FIGS. 6 and 8 illustrate thin film valve devices according to embodiments of the inventive concept that use a nonmagnetic stopple.
Figure 7:
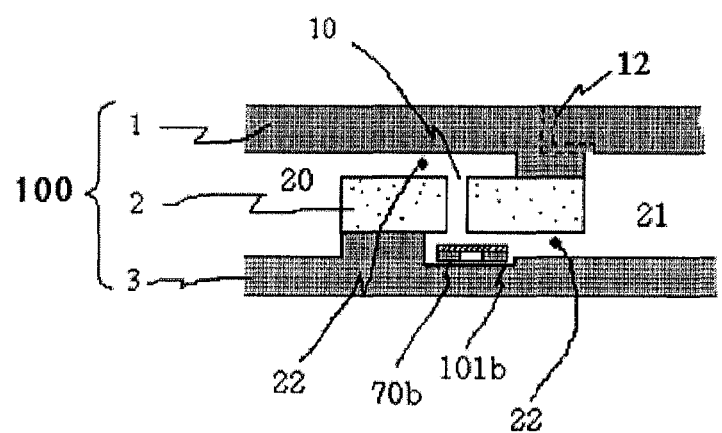
Figure 8:
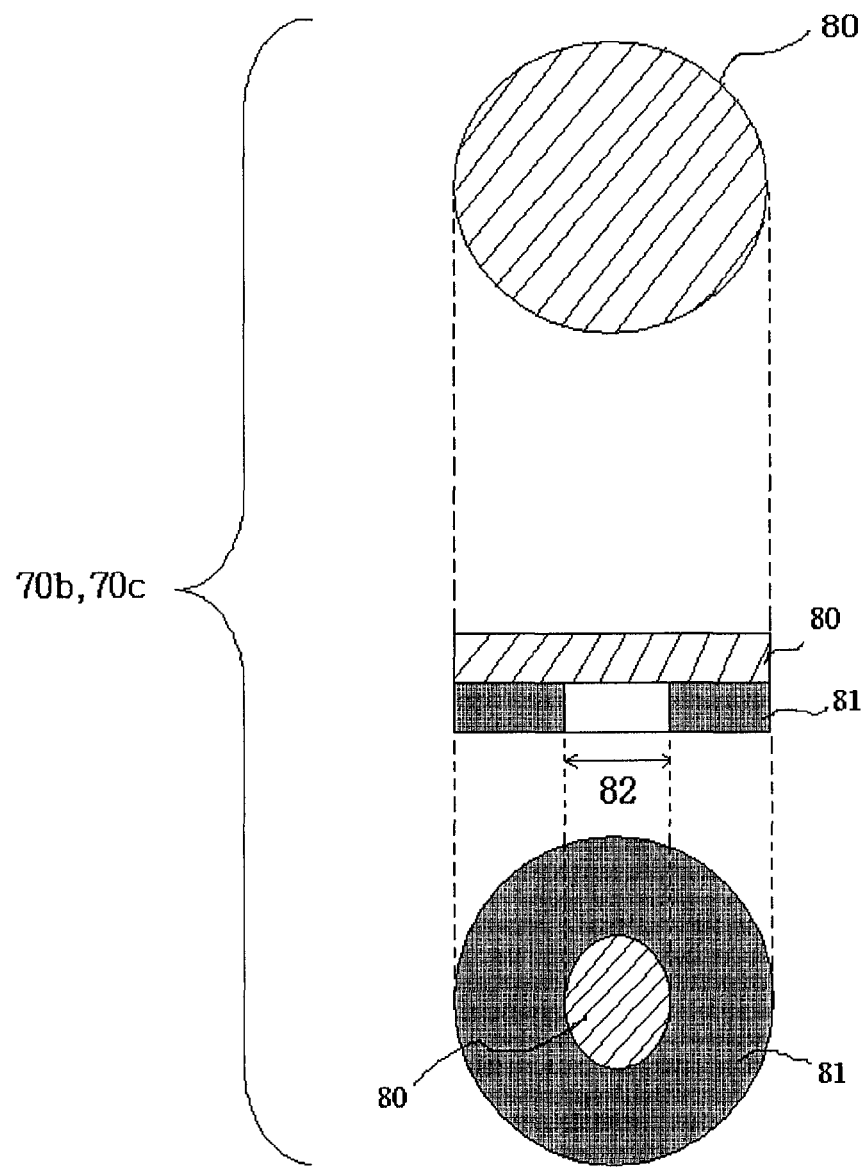

FIGS. 6 through 8 illustrate a thin film valve device according to an embodiment of the inventive concept, which uses a non-magnetic stopple 70b. Reference numerals 1, 2, and 3 denote the upper, intermediate, and lower substrates, respectively, which form the body 100. FIG. 8 is a detailed view of the non-magnetic stopple 70b or a magnetic stopple 70c. The stopple illustrated in FIG. 8 may be the non-magnetic stopple 70b or the magnetic stopple 70c according to the material of an element denoted by reference numeral 81. A surface of either the non-magnetic stopple 70b or the magnetic stopple 70c may be coated with an adhesive 80. The surface coated with the adhesive 80 may be brought to contact the hole 10 in the intermediate substrate 20 to close the hole 10. The adhesive 80 may be a thermoplastic adhesive. FIG. 6 illustrates the state where the channel 22 is blocked as the hole 10 is closed by the non-magnetic stopple 70b. FIG. 7 illustrates the state where the hole 10 is opened as the non-magnetic stopple 70b is separated from the hole 10 due to the heat generated from the heat generating apparatus and the centrifugal force generated as the body 100 rotates. In this case, the adjacent chambers 20 and 21 may be interconnected through the channel 22. In addition, a confining groove 101b may be formed in the lower substrate 3 to stably confine the non-magnetic stopple 70b in the lower substrate 3 when the hole 10 is opened. The confining groove 101b may prevent that the non-magnetic stopple 70b separated from the hole 10 from freely moving away from the hole. In the current embodiment of the inventive concept, the confining groove 101b may have a diameter that is 20%-70% greater than the diameter of the non-magnetic stopple 70b. The non-magnetic or magnetic element 81 may be a metallic material in the form of a cylindrical thin film or a donut-shaped thin film.

FIG. 8 is a detailed view of the non-magnetic stopple 70b or the magnetic stopple 70c. FIG. 8 illustrates an embodiment of the non-magnetic stopple 70b or the magnetic stopple 70c, which includes a metallic element in the form of a donut-shaped thin film. For the magnetic stopple 70c that includes the metallic element in the form of the donut-shaped thin film, a laser beam may be irradiated through a donut hole 82 of the metallic element so that the magnetic stopple 70 can be protected from being demagnetized by the laser beam.

In the thin film valve device according to the current embodiment of the inventive concept, the magnetic element 81 may be formed of a magnetic material having a Curie point (Curie temperature) that is far higher than the softening point of the adhesive 80.

Figure 9:
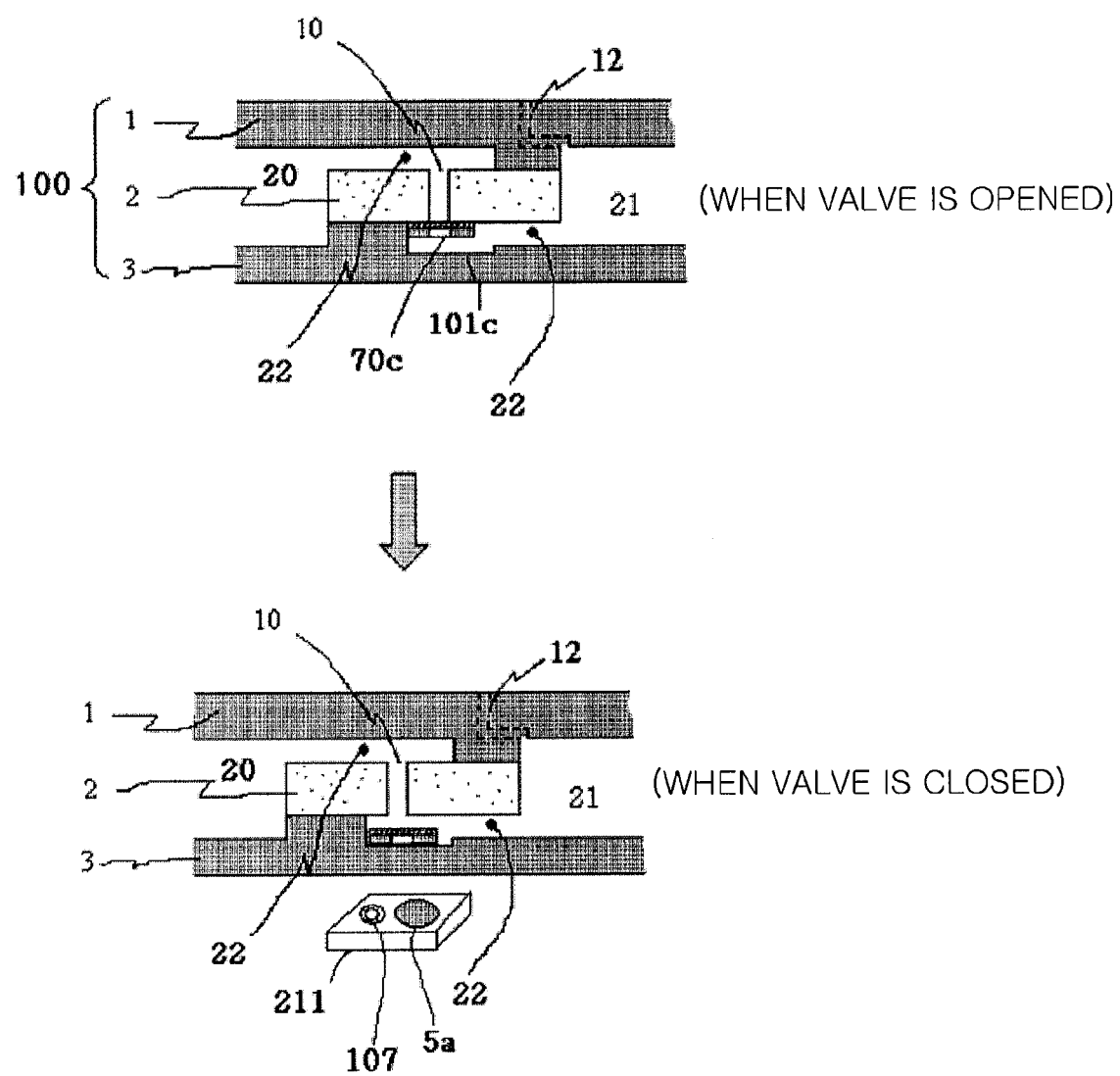
FIGS. 9 and 11 illustrate thin film valve devices according to embodiments of the inventive concept that use a magnetic stopple.
Figure 10:
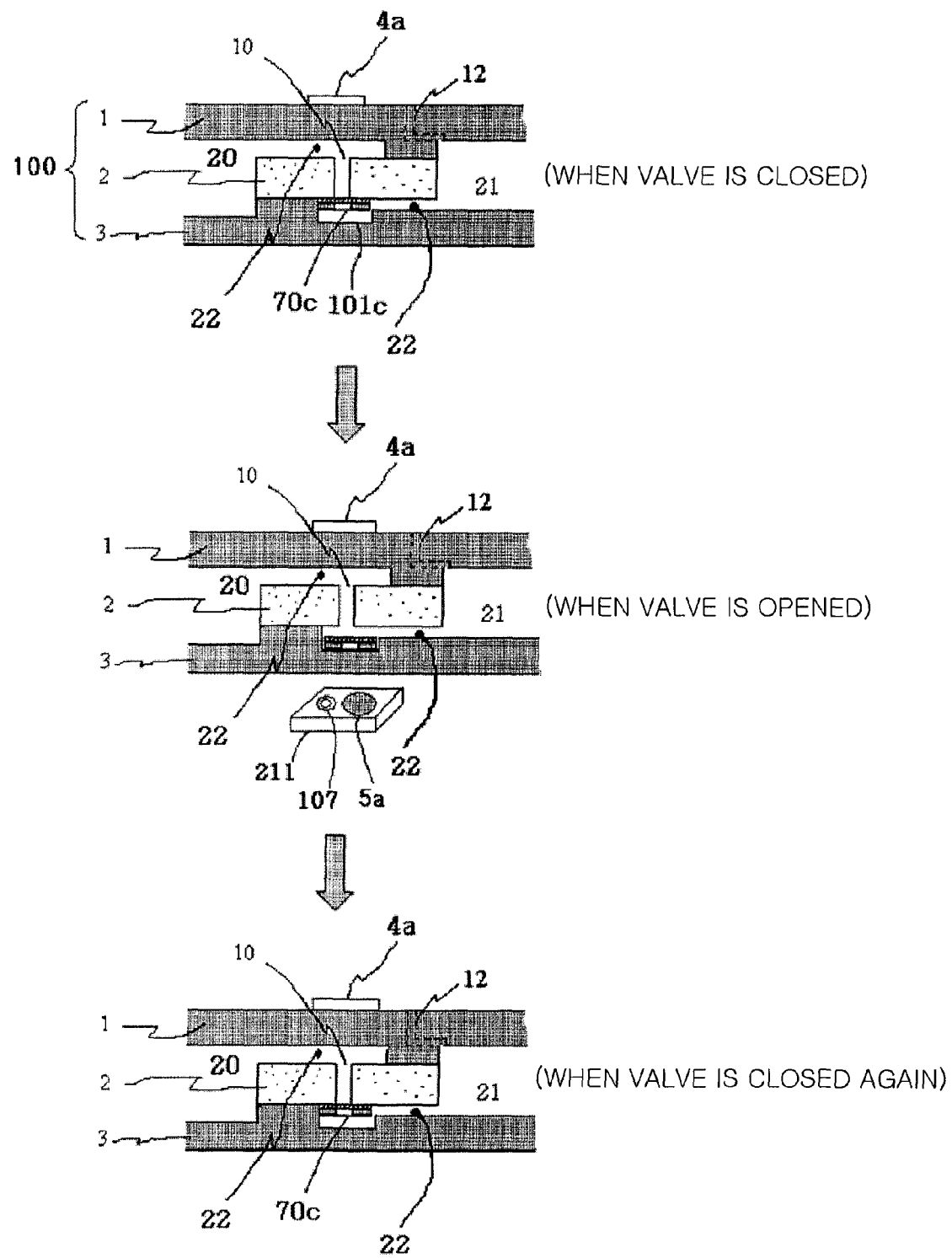
Figure 11:
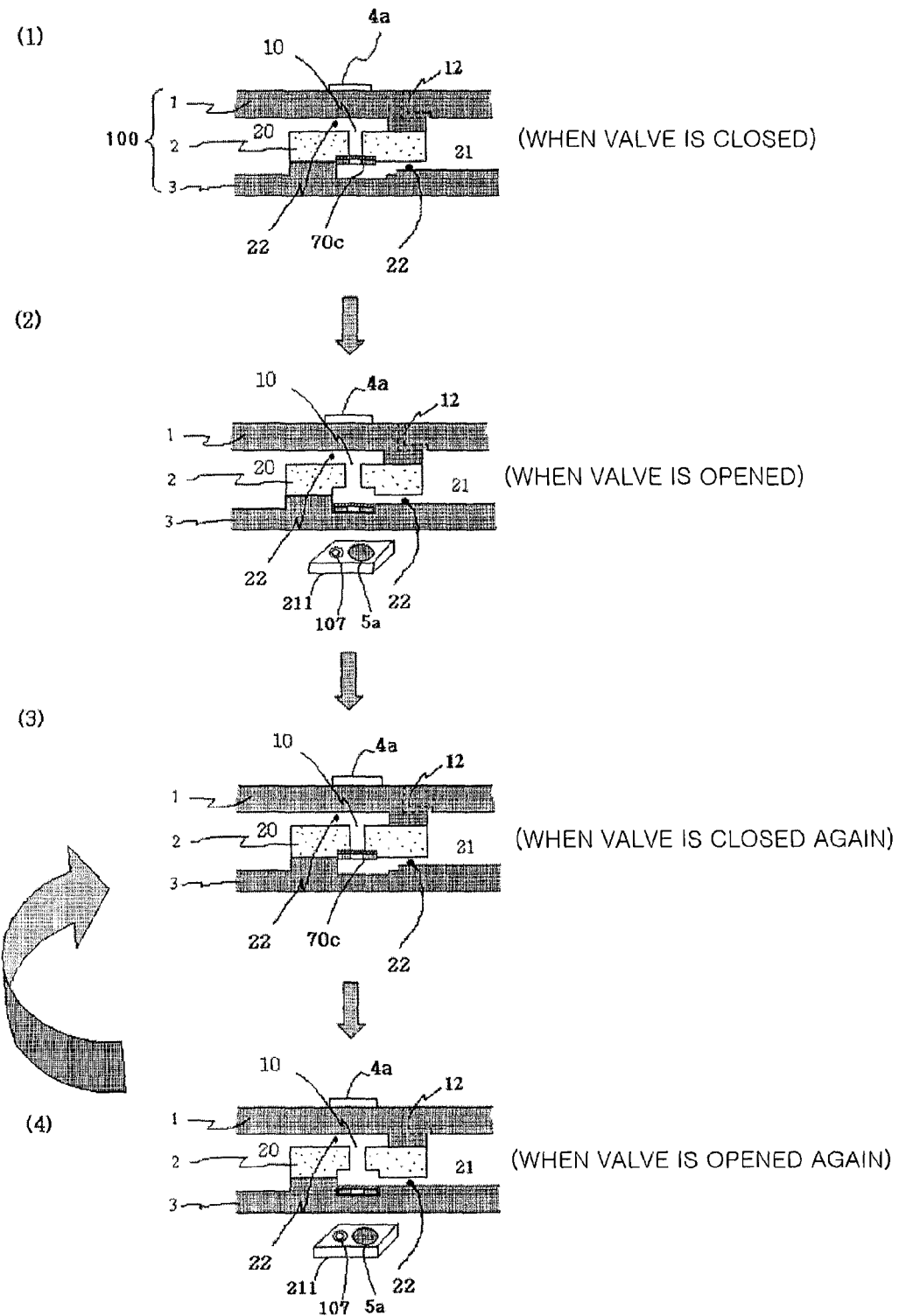

FIGS. 9 through 11 illustrate a thin film valve device according to an embodiment of the inventive concept, which uses the magnetic stopple 70c. Reference numerals 1, 2 and 3 denote the upper substrate, the intermediate substrate, and the lower substrate, respectively, which form the body 100. The magnetic stopple 70c is illustrated in detail in FIG. 8. The magnetic element 81 may be a metallic material or a permanent magnet in the form of a cylindrical thin film or a donut-shaped thin film.

FIG. 9 illustrates a thin film valve device according to an embodiment of the inventive concept in which the channels 22 and the hole 10 are formed between the adjacent chambers 20 and 21 in the body 100 of the thin film valve device. In FIG. 9, it is also illustrated that the hole 10 is closed by the magnetic stopple 70c and that the channels 22 of the adjacent chambers 20 and 22 are interconnected as a result of opening the hole 20 by weakening the adhesive strength of the magnetic stopple 70 using the heat generated from a heat generating apparatus 107 and then using a permanent magnet 5a located under the body 100. An upper drawing in FIG. 9 illustrates that the channels 22 are blocked as the hole 10 is closed by the magnetic stopple 70c. A lower drawing in FIG. 9 illustrates that the hole 10 is opened as the magnetic stopple 70c is separated from the hole 10 due to (i) the heat generated from the heat generating apparatus and the centrifugal force, (ii) the heat generated from the heat generating apparatus 107 and the attraction force between the permanent magnet 5a and the magnetic stopple 70c, or (iii) the heat generated from the heat generating apparatus 107, the centrifugal force, and the attraction force between the permanent magnet 5a and the magnetic stopple 70c. In this case, the adjacent chambers 20 and 21 may be interconnected through the channels 22.

In the thin film valve device according to the current embodiment of the inventive concept, the permanent magnet 5a and the heat generating apparatus 107 may be mounted on a slider 211, which is movable, so that the permanent magnet 5a and the heat generating apparatus 107 can spatially move toward the hole 10.

FIG. 10 illustrates a thin film valve device according to an embodiment of the inventive concept that has a reversible opening/closing function.

In the thin film valve device of FIG. 10, the channels 22 and the hole 10 are formed between the adjacent chambers 20 and 21 in the body 100 of the thin film valve device. The reversible opening/closing function of the thin film valve device of FIG. 10 involves closing the hole 10 using the magnetic stopple 70c, opening the hole 10 by weakening the adhesive strength of the magnetic stopple 70 using the heat generated from a heat generating apparatus 107, and then using a permanent magnet 5a located under the body 100 so that the channels 22 of the adjacent chambers 20 and 22 are interconnected, and closing the hole 10 again using the magnetic stopple 70c by restoring the adhesive strength of the magnetic stopple 70c using the heat generated from the heat generating apparatus 107, and then by moving the permanent magnet 5c away from the center of the hole 10 so that a permanent magnet 4a (hereinafter, referred to as the upper permanent magnet 4a) disposed on an upper portion of the body 100 pulls the magnetic stopple 70c.

A first drawing from the top of FIG. 10 illustrates that the channels 22 are blocked as the hole 10 is closed by the magnetic stopple 70c. A second drawing from the top of FIG. 10 illustrates that the hole 10 is opened as the magnetic stopple 70c is separated from the hole 10 due to (i) the heat generated from the heat generating apparatus and the centrifugal force, (ii) the heat generated from the heat generating apparatus 107 and the attraction force between the permanent magnet 5a and the magnetic stopple 70c, or (iii) the heat generated from the heat generating apparatus 107, the centrifugal force, and the attraction force between the permanent magnet 5a and the magnetic stopple 70c. In this case, the adjacent chambers 20 and 21 may be interconnected through the channels 22. A third drawing from the top of FIG. 10 illustrates that the hole 10 is closed again by the magnetic stopple 70c due to the heat generated from the heat generating apparatus 107 and the attraction force between the upper permanent magnet 4a and the magnetic stopple 70c. In other words, once the adhesive strength of the adhesive 80 has been recovered due to the heat generated from the heat generating apparatus 107, the heat generating apparatus 107 is turned off while the slider 211 is moved away from the center of the hole 10 so that the upper permanent magnet 4a can pull the magnetic stopple 70c to close the hole 10 by the attraction force exerted between the upper permanent magnet 4a and the magnetic stopple 70c. Then, as the adhesive 80 hardens, the magnet stopple 70c tightly closes the hole 10.

FIG. 11 illustrates a thin film valve device according to another embodiment of the inventive concept that has a reversible opening/closing function. In the thin film valve device of FIG. 11, the channels 22 and the hole 10 are formed between the adjacent chambers 20 and 21 in the body 100 of the thin film valve device. The hole 10 may be closed by the magnetic stopple 70c for the period of circulation. When using the thin film valve device, the hole 10 may be opened by weakening the adhesive strength of the magnetic stopple 70 using the heat generated from the heat generating apparatus 107 and then using the permanent magnet 5a located under the body 100, so that the channels 22 of the adjacent chambers 20 and 22 are interconnected. The hole 10 may be closed again by moving the permanent magnet 5a away from the center of the hole 10 so that the upper permanent magnet 4a, which is disposed on the upper portion of the body 100, can pull the magnetic stopple 70c. The hole 10 can be closed again due to the attraction force between the upper permanent magnet 4a and the magnetic stopple 70c. The hole 10 may be opened again by moving the permanent magnet 5a, which is located under the body 100, toward the center of the hole 10. The reversible opening/closing function of the thin film valve device is as described above. In other words, when opening the hole 10 for the first time since the period of circulation, the heat generated from the heat generating apparatus 107 and the attraction force between the magnetic stopple 70c and the lower permanent magnet 5a are used. However, once the hole 10 has been opened for the first time, the hole 10 may be opened again only using the attraction force between the magnetic stopple 70c and either the upper permanent magnet 4a or the lower permanent magnet 5a, without the help of the heat generating apparatus 107. The hole 10 needs to be tightly sealed by the adhesive to prevent evaporation of the fluid stored in the chamber 20 during the period of circulation. To open the thin film valve device having the tightly sealed hole 10 for the first time, the heat generated from the heat generating apparatus 107 may be required.

A first drawing from the top of FIG. 11 illustrates that the channels 22 are blocked as the hole 10 is closed by the magnetic stopple 70c for the period of circulation. A second drawing from the top of FIG. 10 illustrates that the hole 10 is opened for the first time as the magnetic stopple 70c is separated from the hole 10 due to (i) the heat generated from the heat generating apparatus 107 and the centrifugal force, (ii) the heat generated from the heat generating apparatus 107, the centrifugal force and the attraction force between the permanent magnet 5a and the magnetic stopple 70c, or (iii) the heat generated from the heat generating apparatus 107, the centrifugal force, and the attraction force between the permanent magnet 5a and the magnetic stopple 70c. In this case, the adjacent chambers 20 and 21 may be interconnected through the channels 22. A third drawing from the top of FIG. 11 illustrates that the hole 10 is closed again by the magnetic stopple 70c due to the attraction force between the upper permanent magnet 4a and the magnetic stopple 70c. A fourth drawing from the top of FIG. 11 illustrates that the hole 10 is opened again as the magnetic stopple 70c is separated from the hole 10 due to the attraction force between the lower permanent magnet 5a and the magnetic stopple 70c. The reversible opening and closing operations of the thin film valve device thereafter are as illustrated in the third and fourth drawings of FIG. 11.

In order to close the hole 10 to block the channels 22, as illustrated in the third drawing of FIG. 11, the lower permanent magnet 5a is moved away from the center of the hole 10 so that the magnetic stopple 70c can be pulled upwards due to the magnetic force of the upper permanent magnet 4a and close the hole 10. In other words, the hole 10 may be closed due to the attraction force exerted between the upper permanent magnet 4a and the magnetic stopple 70c. Meanwhile, in order to open the hole 10, as illustrated in the second and fourth drawings of FIG. 11, the lower permanent magnet 5a is moved toward the center of the hole 10 so that the magnetic stopple 70c can be pulled downwards by the permanent magnet 5a. In other words, the hole 10 can be opened as the attraction force between the lower permanent magnet 5a and the magnetic stopple 70c becomes stronger than the attraction between the upper permanent magnet 4a and the magnetic stopple 70c. This may be implemented by designing the lower permanent magnet 5a to have a stronger magnetic force than the upper permanent magnet 4a or by locating the lower permanent magnet 5a to be closer to the magnetic stopple 70c than the upper permanent magnet 4a is.

Referring to FIGS. 9 through 11, a confining groove 101c may be formed in the lower substrate 3 to stably confine the magnetic stopple 70c in the lower substrate 3 when the hole 10 is opened. The confining groove 101c may prevent that the magnetic stopple 70c separated from the hole 10 from freely moving away from the hole. In the current embodiment of the inventive concept, the confining groove 101c may have a diameter that is 20%-200% greater than the diameter of the magnetic stopple 70c.

Figure 12:
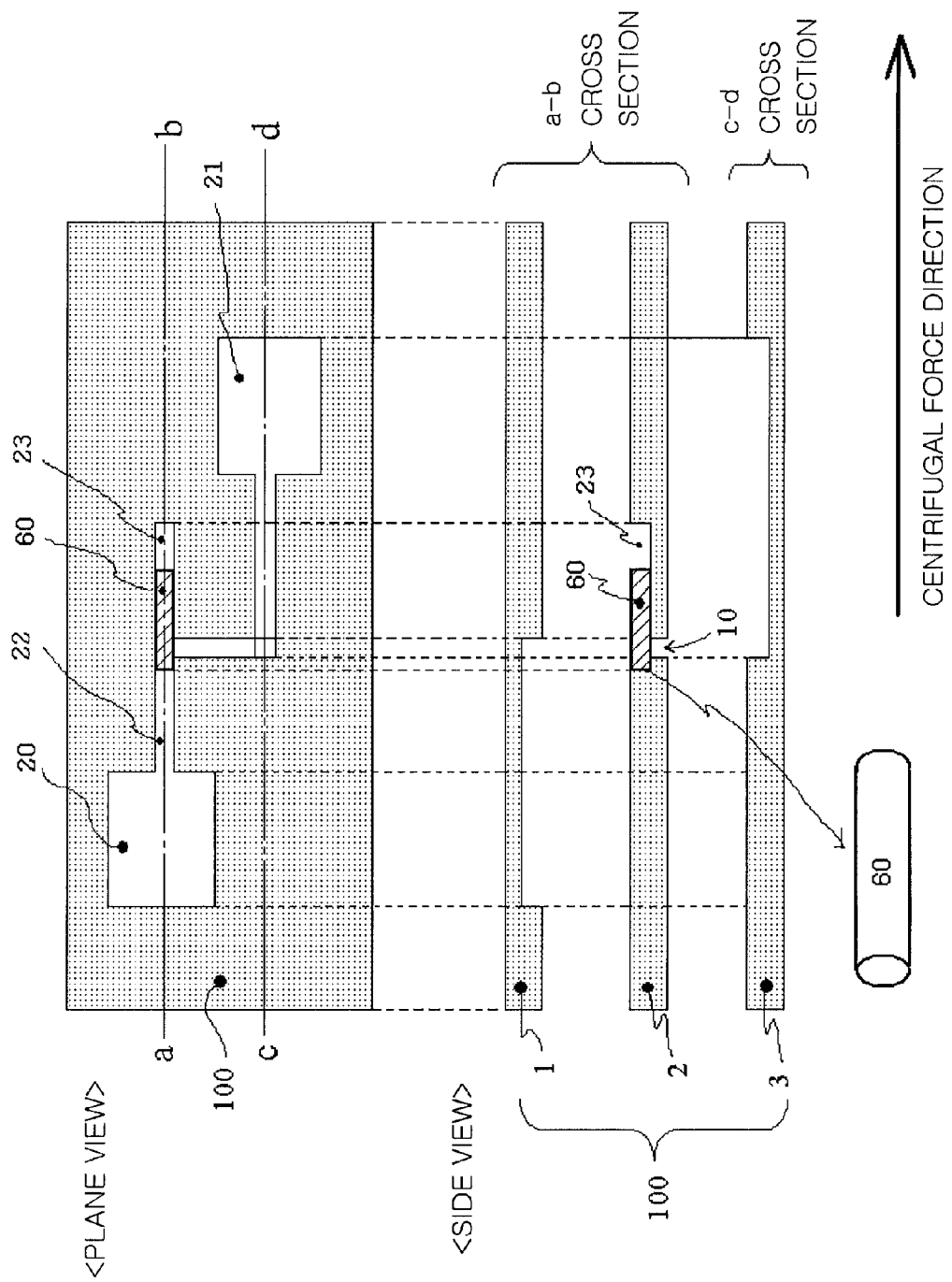
FIGS. 12 and 16 illustrate thin film valve devices according to embodiments of the inventive concept that use a bead (ball) stopple.
Figure 16:
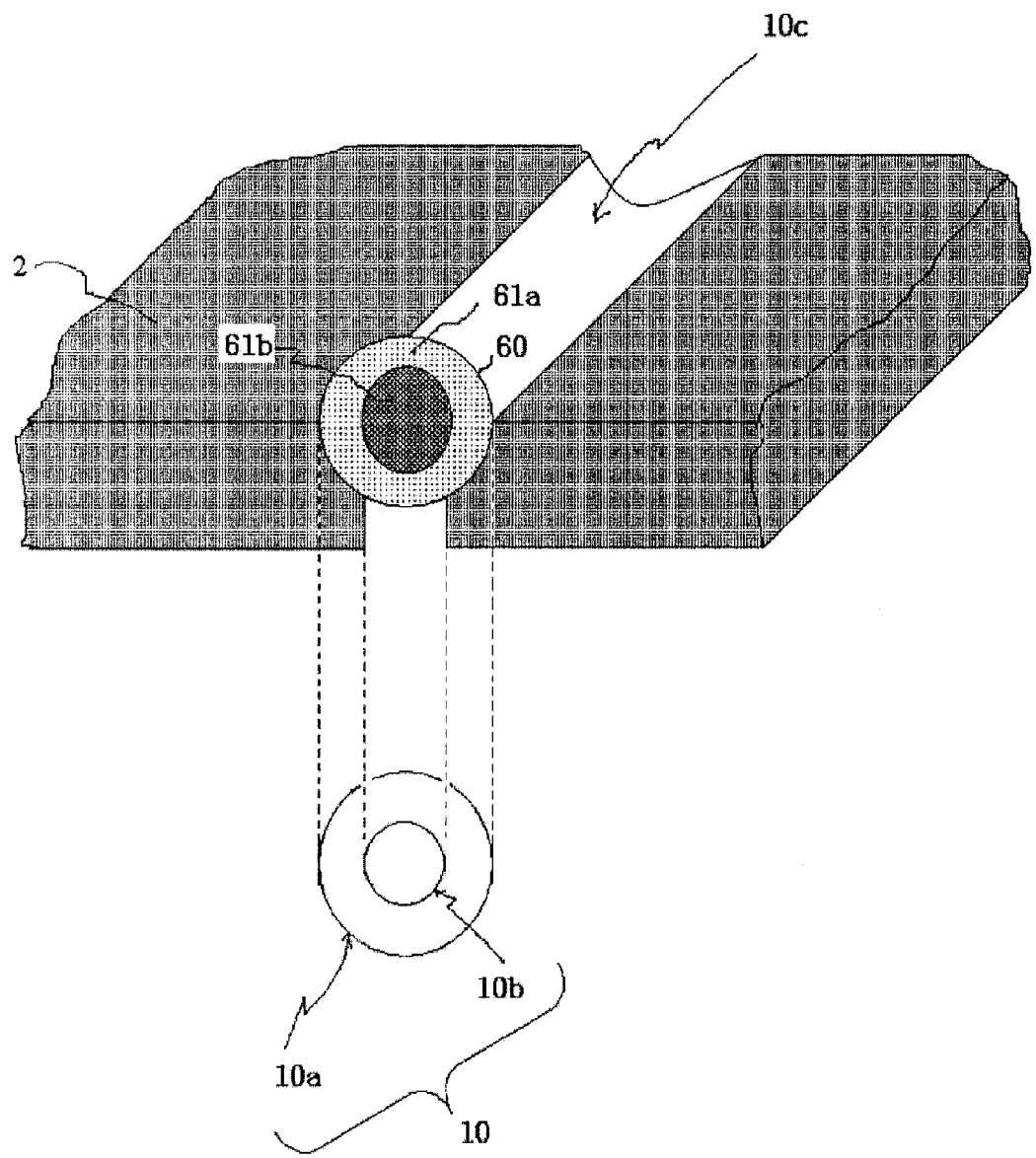

FIGS. 12 and 16 illustrate thin film valve devices according to embodiments of the inventive concept that use a bead (ball) stopple.

Figure 13:
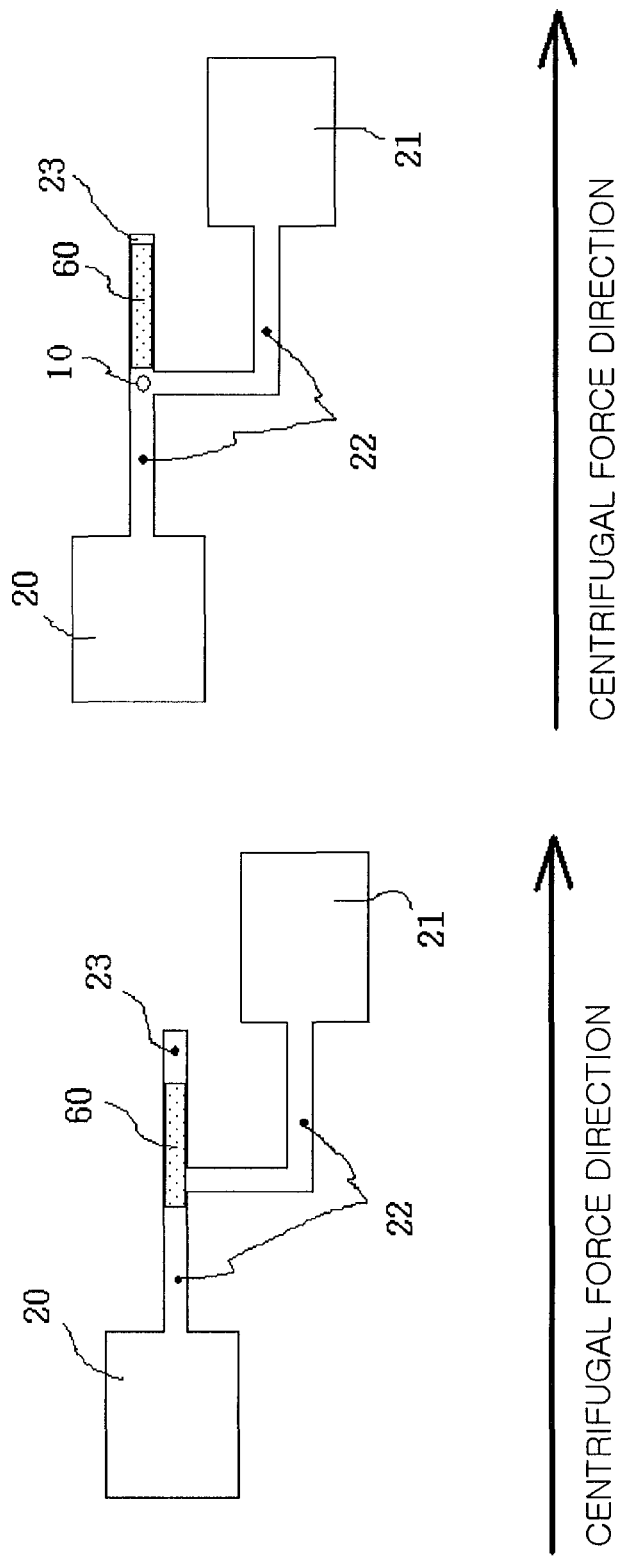
Figure 14:
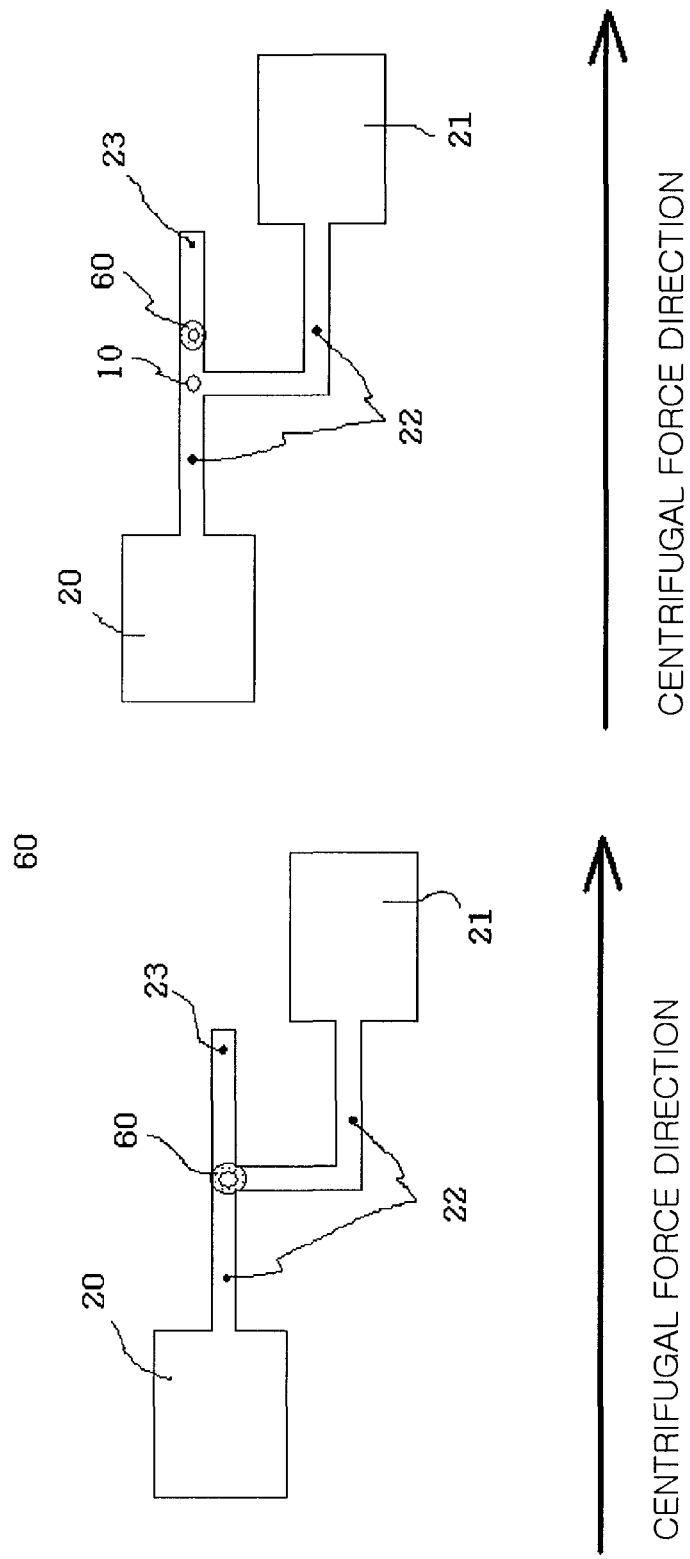
Figure 15:
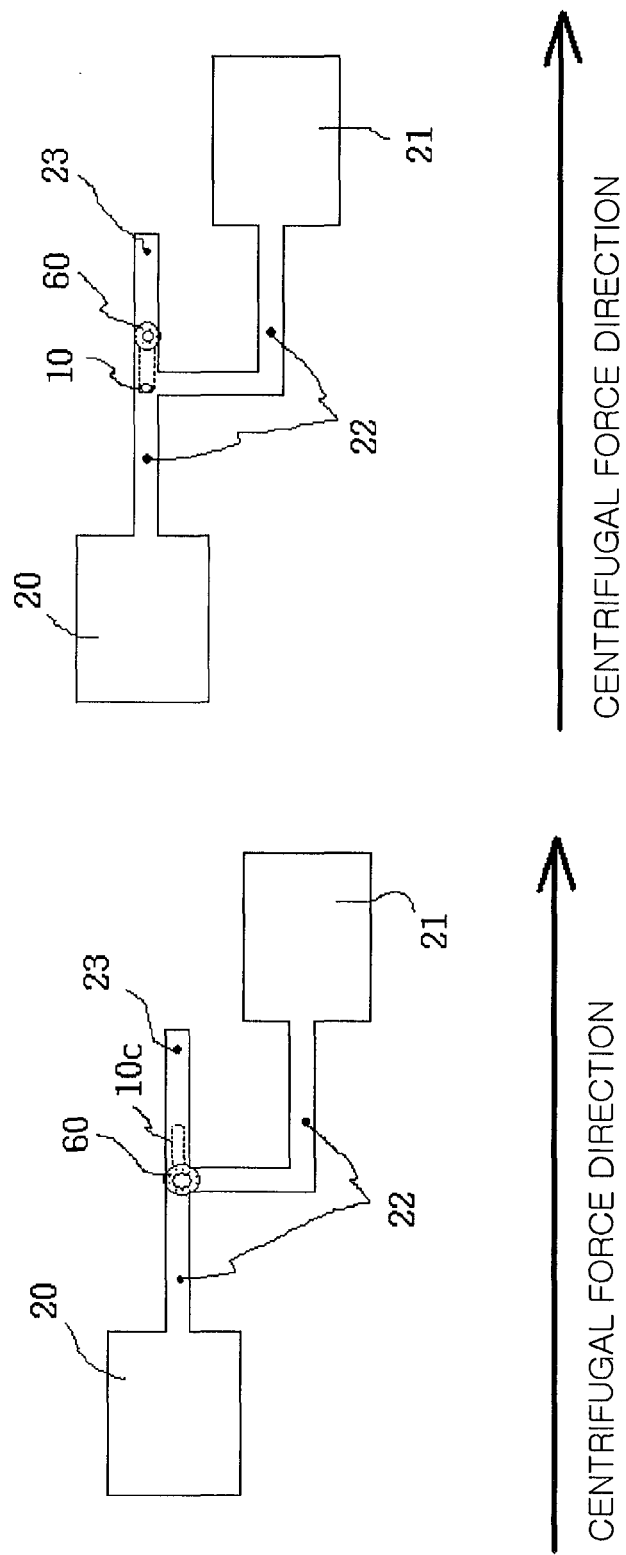

In particular, FIGS. 12 and 13 illustrate a thin film valve device using a cylindrical bead (ball) stopple, and FIGS. 14 through 16 illustrate thin film valve devices using a ball-shaped bead (ball) stopple. The body 100 may include an upper substrate 1, an intermediate substrate 2, and a lower substrate 3. When the upper substrate 1, the intermediate substrate 2, and the lower substrate 3 are formed by injection molding, channels 22 as flow paths, chambers 20 and 22 as buffer reservoirs, and a hole 10 connecting the channels 22 may be formed. The upper substrate 1, the intermediate substrate 2, and the lower substrate 3 are bound together to form a single body 100 of the thin film valve device. The hole 10 is completely closed by a bead (ball) stopple 60, which is inserted near the hole 10, for the period of circulation. Meanwhile, when using the thin film valve device, the bead (ball) stopple 60 is moved toward an auxiliary channel 23 due to the heat generated from the heat generating apparatus and the centrifugal force, so that the hole 10 is opened.

FIG. 13 illustrates the operation of the thin film valve device of FIG. 12.

A left drawing in FIG. 13 illustrates the state where the channels 22 are blocked as the hole 10 is closed by the bead (ball) stopple 60. A right drawing in FIG. 13 illustrates the state where the hole 10 is opened as the bead (ball) stopple 60 is separated from the hole 10 due to the centrifugal force generated as the body 100 rotates and the heat generated from the heat generating apparatus.

FIGS. 14 and 15 illustrate thin film valve devices according to embodiments of the inventive concept, which use a ball-shaped bead (ball) stopple 60. In the state where the hole 10 is closed by the bead (ball) stopple, the bead (ball) stopple 60 is separated from the hole 10 and then moves toward the auxiliary channel 23 due to the heat generated from the heat generating apparatus and the centrifugal force. In this case, in order to make it easier for the bead (ball) stopple 60 to be separated from the hole 10, a bead (ball) channel 10c that conforms to a curvature of the bead (ball) stopple 60 may be formed in the auxiliary channel 23. The auxiliary channel 23 and the bead (ball) channel 10c may be used to hold or move the bead (ball) stopple 60 separated from the hole 10. Left drawings in FIGS. 14 and 15 illustrate the state where the channels 22 are blocked as the hole 10 is closed by the bead (ball) stopple 60. Right drawings in FIGS. 14 and 15 illustrate the state where the hole 10 is opened as the bead (ball) stopple 60 is separated from the hole 10 and moves toward the auxiliary channel 23 due to the centrifugal force generated as the body 100 rotates and the heat generated from the heat generating apparatus.

FIG. 16 illustrates the bead (ball) channel 10c. Reference numeral 10a denotes an outer margin ("outer hole") of the contact region between the bead (ball) stopple 60 and the intermediate substrate 2, and reference numeral 10b denotes an inner margin ("inner hole") of the contact region. As a difference between the diameters of the outer hole 10a and the inner hole 10b becomes larger, the contact area between the bead (ball) stopple 60 and the intermediate substrate 2 becomes larger and leakage of the fluid can be prevented. Reference numeral 61a denotes an adhesive coated on a bead (ball) 61b.

In the thin film valve device according to the current embodiment of the inventive concept, the adhesive for the thin film valve may be a thermoplastic adhesive, and the thin film adhesive tape layer for binding the substrates may be a thermosetting adhesive. In this case, the thermoplastic adhesive on the thin film valve is likely to soften easily due to the heat generated from the heat generating apparatus and its adhesive strength weakens, whereas its neighboring portions and the remaining substrate binding portions are bound by the thermosetting adhesive, and thus their adhesive strength may not weaken due to the heat generated from the heat generating apparatus.

In the thin film valve device according to the current embodiment of the inventive concept, the thermoplastic adhesive (tape) may be a hot melt adhesive, and the thermosetting adhesive (tape) may be an acrylic adhesive.

In the thin film valve device according to the current embodiment of the inventive concept, the thermosetting tape (adhesive) may have a softening temperature of 120 degree or higher, and the thermoplastic tape (adhesive) may have a softening temperature of 60 to 80 degrees. The adhesive on the thin film valve is a thermoplastic adhesive, and the substrate binding portions of the substrates are formed as thin film adhesive tape layers containing a thermosetting adhesive. Thus, the thin film valve is preheated to a temperature that is equal to or higher than the softening temperature of the thermoplastic adhesive and then brought to contact the hole 10 in the intermediate substrate 2. Then, the upper substrate 1 and the lower substrate 3 are bound together. Since the softening point of the thermosetting tape is higher than the softening point of the thermoplastic tape, binding the portions of the substrates formed as thermosetting tapes may be performed irrespective of heating.

FIGS. 17 through 20 illustrate embodiments of a thin film valve control apparatus for controlling the operation of the thin film valve device according to one of the embodiments of the inventive concept described above.

Figure 17:
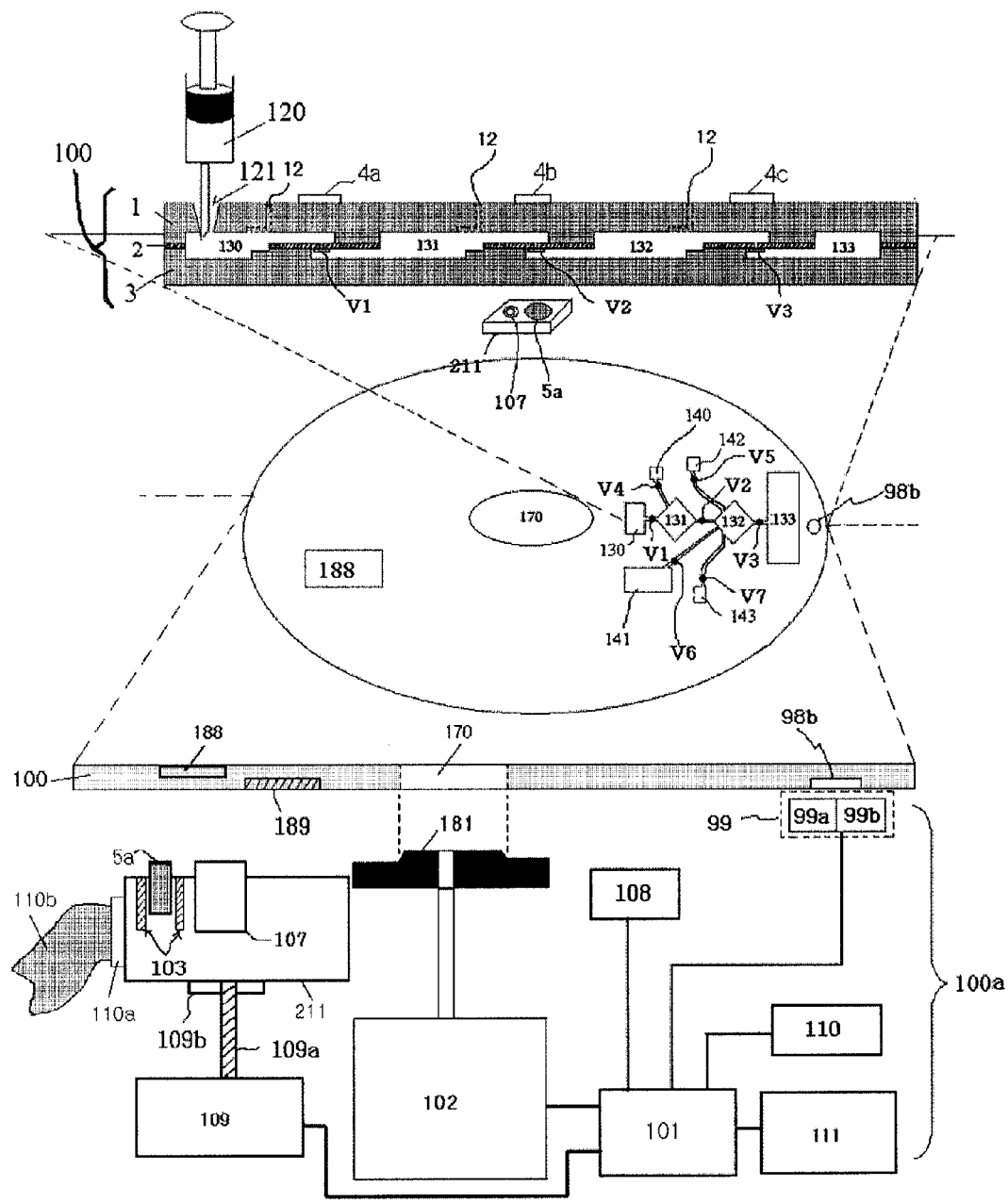

FIG. 17 illustrates an embodiment of the inventive concept in which a laser beam generating apparatus is used as the heat generating apparatus.

FIG. 17 illustrates an embodiment of a thin film valve control apparatus 100a for controlling a thin film valve device 100 in which chambers, channels and thin film valves are integrated, wherein the chambers store various buffer solutions for assays and are used as a space for various chemical reactions, the channels are flow paths of fluids and the buffer solutions, and the thin film valves open and close the channels and holes. The thin film valve control apparatus 100a controls rotation of the thin film valve device 100 and spatial movement of the permanent magnet 5a and a laser beam generating apparatus 107 to selectively open and close the plural thin film valves. Reference numeral 100 denotes the body of the thin film valve device, which is formed by stacking the upper substrate 1, the intermediate substrate 2, and the lower substrate 3 upon one another. When the upper substrate 1, the intermediate substrate 2, and the lower substrate 3 are formed by injection molding, the channels as flow paths, the chambers as buffer reservoirs, and plural holes connecting the channels are formed. The upper substrate 1, the intermediate substrate 2, and the lower substrate 3 are bound together to form a single body 100. The valve operation for the chambers 130, 131, 132, 133, 140, 141, 142, and 143 may be performed by the thin film valves V1, V2, V3, V4, V5, V6, and V7, wherein the thin film valves V1, V2, V3, V4, V5, V6, and V7 use the magnetic stopple 70c of FIG. 11 among the other types of thin film valves described above. The thin film valves V1, V2, V3, V4, V5, V6 and V7 may be separately controlled to be opened or closed by the magnetic force of the upper permanent magnets 4a, 4b and 4c and the movable permanent magnet 5a. Reference numeral 120 denotes a sample injection element, such as a dispenser, a pipette, a syringe, or a lancet. Reference numeral 121 denotes a sample injection hole, and reference numeral 170 denotes a disc aperture. Reference numeral 130 denotes a preparation chamber for preparing a sample from an assay material (biomaterial) to be assayed, reference numeral 131 denotes a buffer chamber for amplifying the sample, diluting or mixing the sample, or labeling the sample, reference numeral 132 denotes a chamber for biological, chemical, or biochemical reactions and which is an assay site where capture probes for assaying the sample in the buffer chamber are attached to or immobilized on a substrate by an immobilizing element, and reference numeral 133 denotes a trash chamber for collecting wastes generated through a washing process. The capture probes may be attached or immobilized as an array to detect multiple analytes from a single assay material or sample. A DNA chip, a protein chip, a bio chip, a porous membrane, or a 96-well plate may be integrated in the assay site 132. Examples of the porous membrane include a nitrocellulose (NC) membrane, a nylon membrane, or nanotubes, which induce diffusion of the sample. A 96-well plate, a 384-well plate, or a 1536-well plate may be used for biochemical and molecular biological assays to screen novel drugs or materials. The preparation chamber 130 may be used to extract DNA from blood, to extract serum or blood plasma from blood by centrifugal separation as the body 100 rotates at a high speed, or to extract agricultural chemicals, bacteria, or heavy metallic components from agricultural products. The amplification process may involve a polymerase chain reaction (PCR) process of amplifying DNA or a process of multiplying bacteria in an enrichment culture medium. Reference numerals 140, 141, 142, and 143 may store an extraction solution for extracting the sample from the assay material, various enzymes including a polymerase and primers for the amplification process, enzymes for hybridization, a dilute solution for diluting the sample, a labeling material, and biochemical materials for biochemical reactions, a washing solution, and the like. Reference numeral 102 denotes a spindle motor for rotating the thin film valve device 100. Reference number 211 denotes a slider on which the movable permanent magnet and the laser beam generating apparatus 107 are mounted and whose operation may be controlled by a slider motor 109 and worm gear connection units 109a and 109b. At the start and end points of each of the processes (preparation process, amplification process, mixing process, dilution process, labeling process, biological, chemical or biochemical reaction processes, or washing process, the opening and closing of the thin film valves may be controlled due to the spatial movement of the permanent magnet 5a and the laser beam generating apparatus 107, which are mounted on the slider 211, with respect to the corresponding thin film valve and due to the centrifugal force generated as the body 100 rotates.

According to another embodiment of the inventive concept, when opening or closing the thin film valves, spatial movements (spatial addressing) with respect to the thin film valves in radial and azimuthal directions may precede. The spatial addressing comprises a radial and azimuthal addressing with respect to the thin film valve.

The spatial movement in the radial direction with respect to the thin film valves may be implemented by the slider motor 109, which reversibly moves the slider in the radial direction. The slider 211 may be moved from the center of the body 100 to outward or from outward to the center of the body 100 in the radial direction by the slider motor 109.

According to another embodiment of the inventive concept, once the spatial movement in the radial direction has been complete, the spatial movement in the azimuthal direction with respect to the thin film valves may be implemented by radiating a pulse beam or a continuous beam output from the laser beam generating apparatus 107 onto the rotating body 100. The pulse beam may be generated as the laser beam generating apparatus 107 periodically turns on at the azimuthal position of the corresponding thin film valve, which is calculated based on a reference trigger signal obtained by an azimuth angle detector 99. The reference trigger signal indicates a reference azimuth angle of the body 100.

According to another embodiment of the inventive concept, a temperature of the pulse beam or continuous beam may be similar to the softening temperature of the thermoplastic adhesive. The pulse beam or continuous beam may heat the adhesive used to bind the substrates as well as the adhesive around the holes and weaken the adhesive strength of the adhesives. However, in practice, the pulse beam or continuous beam is unlikely to weaken the adhesive strength of the thermosetting adhesive binding the substrates since the softening temperature of the thermosetting adhesive is higher than the softening temperature of the thermoplastic adhesive around the holes.

According to another embodiment of the inventive concept, the azimuth angle detector 99 may be implemented as a photo-coupler.

According to another embodiment of the inventive concept, the azimuth angle detector 99 may be a reflective or transmissive photodetector.

According to another embodiment of the inventive concept, while the laser beam generating apparatus 107 and the permanent magnet 5a for opening or closing the thin film valves are mounted on the slider 211, the slider 211 is spatially moved in the radial and azimuth directions to selectively (individually) or independently control the opening and closing of the plural thin film values.

According to another embodiment of the inventive concept, the permanent magnet 5a may be moved upwards and downwards by an up/down motion control element 103 so that the gap between the body 100 and the permanent magnet 5a is controlled. The up/down motion control element 103 may control the permanent magnet 5a to move upwards and downwards by controlling the rotation of gears and the amount of current flowing through the electromagnet. Reference number 110b denotes a flexible cable for transmitting various control signals required for the up/down motion control element 103 and the lager beam generating apparatus 107, which are mounted on the slider 211. The flexible cable 110b may be connected to a central control unit 101 through a wafer or harness 110a. Reference number 181 denotes a turntable on which the thin film valve device 100 is to be placed. The thin film valve device 100 can be front- or top-loaded on the turntable 181 through the disc aperture 170. Reference numeral 188 denotes a wireless radio frequency integrated circuit (RFIC) with a built-in memory, which may include a protocol for the thin film valve device 100, an assay algorithm, reference control values, location information of the assay site, bioinformatics information, and self-diagnosis related information. In addition, personal encryption information and ID information of the thin film valve device may be stored to prevent unauthorized use. The wireless RFIC 188 may be a smart IC card. The information stored in the wireless RFIC 188 may be wirelessly provided to the central control unit 101 and may be used to encrypt personal data. Reference number 110 denotes a radio frequency generation unit for supplying power to the wireless RFIC 188. A sufficient amount of electricity is generated as an induction coil in the wireless RFIC 188 responds to waves generated by the radio frequency generation unit 110 according to the Fleming's rule, and may be supplied to the wireless RFIC 188.

According to another embodiment of the inventive concept, the thin film valve control apparatus may further include a solar battery 189 for supplying power to the wireless RFIC 188.

According to another embodiment of the inventive concept, the thin film valve control apparatus may further include an illuminating unit 108 for supplying light energy to the solar battery 189 in the thin film valve device 100. The illuminating device 108 may include a high-brightness light emitting diode (LED) module in which multiple high-brightness LEDs are integrated, or a lamp.

According to another embodiment of the inventive concept, an ID of the thin film valve device 100 may be wirelessly transmitted to the central control unit 101 through the wireless RFIC 188 when the thin film valve device 100 is loaded onto the thin film valve control apparatus 100a, so that the central control unit 101 can recognize the currently loaded disc as a thin film valve device.

According to another embodiment of the inventive concept, the thin film valve control apparatus may further include an input/output unit 111.

According to another embodiment of the inventive concept, the input/output device 111 may comply with a communication standard of a universal serial bus (USB), IEEE1394, ATAPI, SCSI, IDE or a wired/wireless Internet connection.

FIG. 18 illustrates an embodiment of the photodetector 99. If the photodetector 99 is a transmissive photodetector, the photodetector 99 may generate a reference trigger signal whenever a reference hole 98a of the rotating body 100 passes between photo-couplers 99a and 99b and provide the reference trigger signal to the central control unit 101. If the photodetector 99 is a reflective photodetector, the photodetector 99 may generate a reference trigger signal whenever a reference reflector 98b on the rotating body 100 passes over the photo-couplers 99a and 99b and provide the reference trigger signal to the central control unit 101. The central control unit 101 may turn on the laser beam generating apparatus 107 in synchronization with the reference trigger signal only when a specific thin film valve is located to correspond to the laser beam generating apparatus 100 so that only the corresponding thin film valve is selectively heated while the body 100 rotates.

Figure 19:
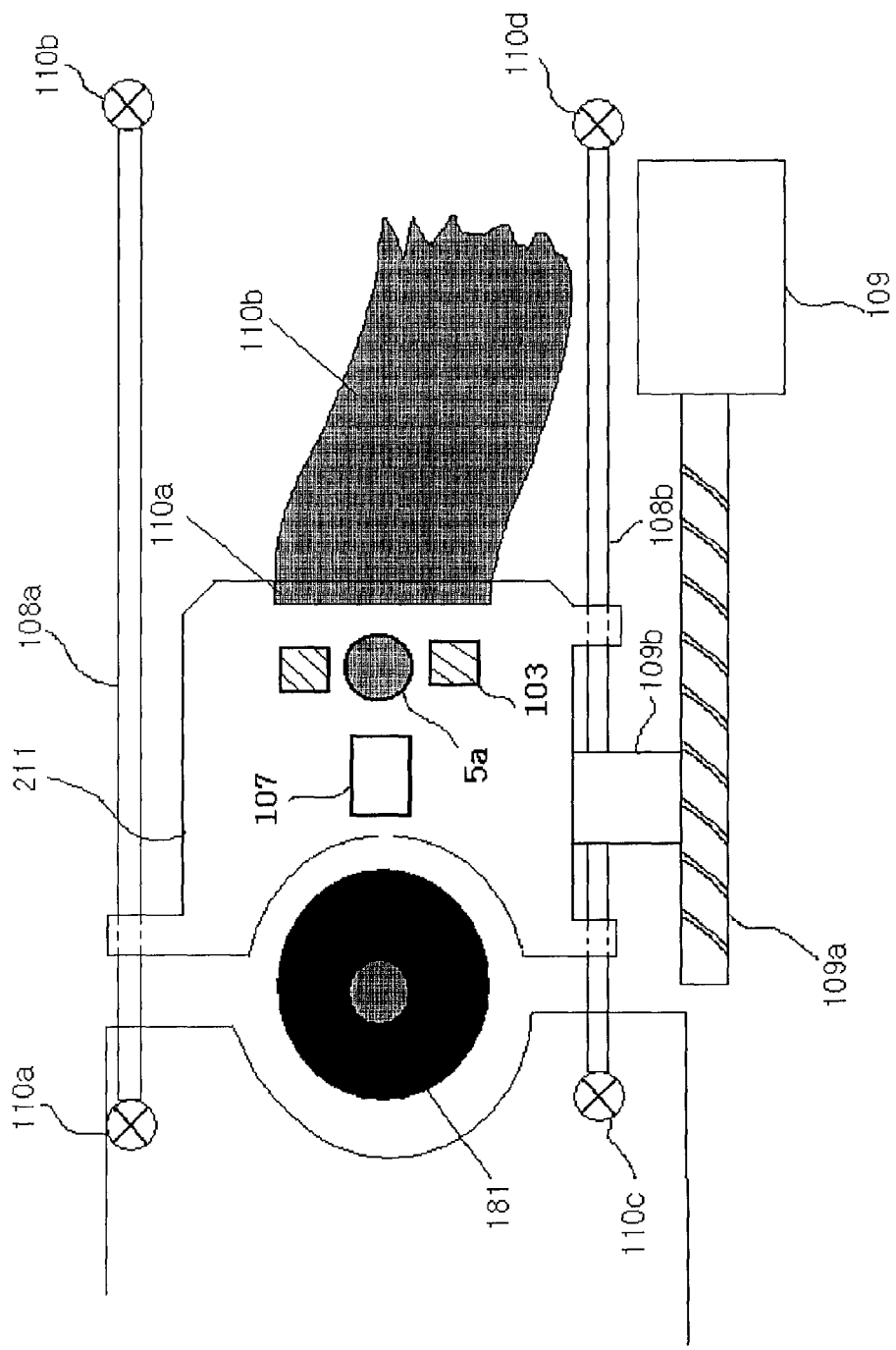

FIG. 19 illustrates an embodiment of the slider 211 on which the laser beam generating apparatus 107, the permanent magnet 5a and the up/down motion control element 103 are mounted. The movement of the slider 211 may be controlled by the worm gear connection units 109a and 109a that are connected to a shaft of the slider motor 109. The slider 211 can be smoothly moved using slide arms 108a and 108b as guides. The slide arms 108a and 108b may be coupled to the body of the thin film valve control apparatus 100a by means of screws 110a, 110b, 110c, and 110d. Reference number 100b denotes a flexible cable, which can be connected to the central control unit 101 through the connection with a wafer or harness 110a. Reference number 181 denotes a turntable rotated by the spindle motor 102.

Figure 20:
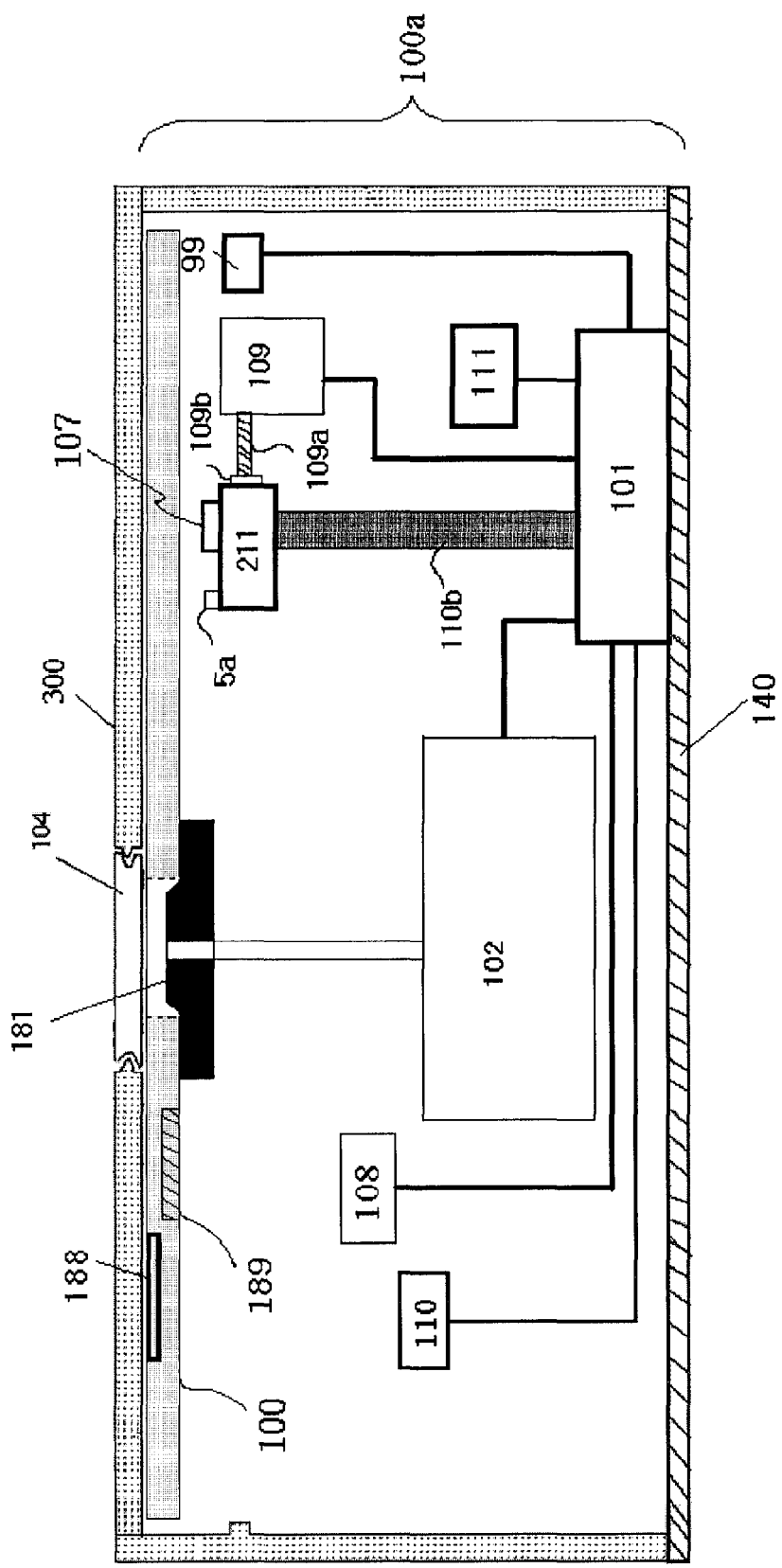

FIG. 20 illustrate an embodiment of a thin film valve control apparatus 100a for controlling the opening and closing of thin film valves of the thin film valve device according to one of the embodiments of the inventive concept described above. Reference number 300 denotes a body supporting the thin film valve control apparatus 100a. A circuit board 140, which forms the bottom of the thin film valve control apparatus 100a, is bound to the body 300 of the thin film valve control apparatus 100a. The central control unit 101 for controlling the thin film valve control apparatus 1001, a radio frequency generation unit 110, the illuminating unit 108, and the input/output unit 111 may be arranged on the circuit board 140. The central control unit 101 may control the spindle motor 102 to rotate or stop the thin film valve device 100, may control the slide motor 109 to spatially move the laser beam generating apparatus 107, and may control the laser beam generating apparatus 107 to periodically output pulse beams when a thin film valve locates at an azimuth angle position that is calculated based on a reference trigger signal obtained by the azimuth angle detector 99.

According to another embodiment of the inventive concept, the central control unit 101 may further include a voice synthesis element to provide a user with a user guide and an additional explanation of each process according to the type of the thin film valve device loaded onto the thin film valve control apparatus 100a. Reference numeral 104 denotes a compression element that compresses the thin film valve device 100 loaded around the disc aperture. The compression element 104 may be designed as an idle turntable that may exert the magnetic attraction force on the turntable 181 so that thin film valve device 100 can be compressed due to the magnetic attraction force, and that allows vertical movement and idle rotation of the thin film valve device 100.

The invention claimed is:

1. A thin film valve device comprising:
   at least one chamber that stores a fluid required for biological or biochemical assay and in which a biological or biochemical reaction is performed;
   a sample injection element for injecting a sample;
   a channel that connects the at least one chamber and through which the fluid moves;
   a hole that is located in the middle of the channel and interconnects upper and lower portions of the channel;
   a thin film valve that closes the hole and is coated with an adhesive;
   at least one substrate including the channel, the hole and the at least one chamber;
   a thin film adhesive tape that binds the at least one substrate together;
   a body that is formed by binding the at least one substrate using the thin film adhesive tape and in which the channel, the hole, the at least one chamber, the sample injection element, and the thin film valve are integrated; and
   a heat generating apparatus that radiates heat onto the thin film valve to change an adhesive strength of the adhesive.

2. The thin film valve device of claim 1, wherein the hole is opened by weakening the adhesive strength of the adhesive using the centrifugal force generated as the body rotates and heat generated from the heat generating apparatus to separate the thin film valve from the hole;
   by weakening the adhesive strength of the adhesive using the heat generated from the heat generating apparatus and then using the centrifugal force generated as the body rotates to separate the thin film valve from the hole;
   by weakening the adhesive strength of the adhesive using the heat generated from the heat generating apparatus and a magnetic force to separate the thin film valve from the hole;
   by weakening the adhesive strength of the adhesive using the heat generated from the heat generating apparatus and by separating the thin film valve from the hole using the magnetic force; or
   by weakening the centrifugal force generated as the body rotates and the heat generated from the heat generating apparatus and by separating the thin film valve from the hole using the magnetic force.

3. The thin film valve device of claim 1, wherein the at least one chamber comprises:
   a preparation chamber for a process of preparing a sample from an assay material (biomaterial) to be assayed;
   a buffer chamber for a process of amplifying the sample, diluting or mixing the sample, or labeling the sample;
   a chamber for biological, or biochemical reactions and which is an assay site where capture probes for assaying the sample in the buffer chamber are attached to or immobilized on the substrate by an immobilizing element; and
   a trash chamber for collecting waste generated through a washing process.

4. The thin film valve device of claim 3, wherein the capture probes are attached or immobilized as an array to detect multiple analytes from a single assay material or sample.

5. The thin film valve device of claim 3, wherein a bio chip comprising a DNA chip and a protein chip, a porous membrane, or a well plate is integrated in the assay site.

6. The thin film valve device of claim 1, wherein the at least one channel comprises a thin film channel formed by the thin film adhesive tape.

7. The thin film valve device of claim 1, wherein the at least one substrate comprises an upper substrate, an intermediate substrate and a lower substrate, which are stacked upon one another; and
   the body is assembled by attaching the thin adhesive tape on the at least one substrate or by printing the thin film adhesive tape using a dispenser, spray or silk screen, to coat a surface of the at least one substrate with the thin film adhesive tape; and stacking the at least one substrate upon one another and binding together.

8. The thin film valve device of claim 7, wherein the thin film adhesive tape comprises a hole closing film.

9. The thin film valve device of claim 1, wherein the thin film adhesive tape forms a hole closing film around the hole when the at least one substrate is bound together to assemble the body.

10. The thin film valve device of claim 9, wherein the thin film adhesive tape comprises the hole closing film and a substrate binding portion, wherein the hole closing film is formed of a thermoplastic adhesive and the substrate binding portion is formed of a thermosetting adhesive film.

11. The thin film valve device of claim 10, wherein the thermosetting adhesive has a softening temperature of about 120 degrees or higher,
    and the thermoplastic adhesive has a softening temperature of about 60 to about 80 degrees.

12. The thin film valve device of claim 9, wherein the thin film adhesive tape comprises the hole closing film and a substrate binding portion, wherein the hole closing film is formed of a hot melt adhesive and the substrate binding portion is formed of an acrylic adhesive.

13. The thin film valve device of claim 9, wherein the adhesive forming the hole closing film has a softening point that is lower than a softening point of the adhesive forming a substrate binding portion.

14. The thin film valve device of claim 9, wherein the thin film adhesive tape is formed by coating a thermosetting adhesive on upper and lower surfaces of a polyethyleneterephthalate (PET) film, and the hole closing film is formed by additionally coating a thermoplastic adhesive around the hole.

15. The thin film valve device of claim 9, wherein the hole closing film is formed by coating a thermoplastic adhesive on the thin film adhesive tape using silk screen printing, a dispenser process, or spray printing with a mask pattern having an opening exposing only a region to be the hole closing film.

16. The thin film valve device of claim 1, wherein the thin film valve is selected from the group consisting of a bead (ball) stopple, a heat shrinkable stopple, a nonmagnetic stopple, a magnetic stopple, and a hole closing film formed of the thin film adhesive tape.

17. The thin film valve device of claim 16, wherein the nonmagnetic stopple is formed of a metallic material in the form of a cylindrical thin film or a donut-shaped thin film.

18. The thin film valve device of claim 16, wherein the magnetic stopple is formed of a magnetic material or a permanent magnetic material in the form of a cylindrical thin film or a donut-shaped thin film.

19. The thin film valve device of claim 18, wherein the magnetic material has a Curie point (Curie temperature) that is higher than the softening point of the adhesive.

20. The thin film valve device of claim 16, wherein the body further comprises a confining groove or a confining channel to prevent the thin film valve from freely moving away from the hole.

21. The thin film valve device of claim 20, wherein the confining groove further comprises a pressure jaw having a diameter that is greater than a diameter of the heat shrinkable stopple after shrinking and is less than the original diameter of the heat shrinkable stopple before shrinking.

22. The thin film valve device of claim 16, having a reversible opening/closing function that involves:
   opening the hole closed by the magnetic stopple by weakening the adhesive strength of the magnetic stopple using the heat generated from the heat generating apparatus and then by using a magnetic force exerted as a result of moving a permanent magnet located under the body toward the center of the hole; and
   closing the hole again by restoring the adhesive strength of the magnetic stopple using the heat generated from the heat generating apparatus and then by moving the permanent magnet located under the hole away from the center of the hole so that a magnetic force of a permanent magnet disposed over the hole is exerted on the magnetic stopple to close the hole.

23. The thin film valve device of claim 16, having a reversible opening/closing function that involves:
   first opening the hole closed by the magnetic stopple by weakening the adhesive strength of the magnetic stopple using the heat generated from the heat generating apparatus and then by using a magnetic force exerted as a result of moving a permanent magnet located under the body toward the center of the hole;
   closing the hole using the magnetic stopple by moving the permanent magnet located under the hole away from the center of the hole so that a magnetic force of a permanent magnet disposed over the hole is exerted on the magnetic stopple; and
   opening the hole again by moving the permanent magnet located under the body toward the center of the hole so that the magnetic force is exerted on the magnetic stopple to open the hole.

24. The thin film valve device of claim 16, wherein the body further comprises an auxiliary channel or a bead (ball) channel for moving or holding the bead (ball) stopple which is separated from the hole.

25. The thin film valve device of claim 16, wherein the heat shrinkable stopple comprises a material selected from the group consisting of a Teflon-based material, a silicon-based material, and a polyolefin-based material.

26. The thin film valve device of claim 1, wherein the adhesive coated on the thin film valve comprises a thermoplastic adhesive, and the thin film adhesive tape that binds the at least one substrate comprises a thermosetting adhesive.

27. The thin film valve device of claim 26, wherein the thermoplastic adhesive comprises a hot melt adhesive, and the thermosetting adhesive comprises an acrylic adhesive.

28. The thin film valve device of claim 1, wherein the body further comprises a wireless radio frequency integrated circuit (RFIC) or a solar battery for supplying power to the wireless radio frequency integrated circuit (RFIC).

29. The thin film valve device of claim 1, wherein the thin film valve is closed for a period of circulation due to a magnetic force of a permanent magnet disposed above the hole and the adhesive strength of the adhesive.

30. The thin film valve device of claim 1, wherein the thin film valve is closed for a period of circulation due to the adhesive strength of the adhesive.

31. The thin film valve device of claim 1, wherein the adhesive is selected from the group consisting of a hot melt adhesive, a silicon adhesive, a rubber-based adhesive, a modified silicon-based adhesive, an acrylic adhesive, a polyamide adhesive, a polyolefin adhesive, a Teflon-based adhesive, an epoxy adhesive, a UV curable adhesive, a UV adhesive, a thermoplastic resin, a gel, a wax, a thermosetting tape, and a thermoplastic tape.

32. The thin film valve device of claim 31, wherein the gel comprises a material selected from the group consisting of polyacrylamides, polyacrylates, polymethacrylates, and polyvinylamides.

33. The thin film valve device of claim 31, wherein the thermoplastic resin comprises a material selected from the group consisting of COC, PMMA, PC, PS, POM, PFA, PVC, PP, PET, PEEK, PA, PSU, and PVDF.

34. The thin film valve device of claim 31, wherein the wax comprises a material selected from the group consisting of a paraffin wax, a synthetic wax, and a microcrystalline wax.

35. The thin film valve device of claim 1, wherein the adhesive further comprises a plurality of micro-sized heat generating particles that generate heat by absorbing energy generated from the heat generating apparatus.

36. The thin film valve device of claim 1, wherein the body is formed of a material selected from the group consisting of silicon, plastic, aerogel, polymethyl methacrylate (PMMA), glass, polypropylene, polyacrylate, polyvinylalcohol, polyethyelene, a cyclic olefin copolymer (COC), and polycarbonate.

37. The thin film valve device of claim 1, wherein a surface of the body is coated with aluminum or an aluminum sheet to prevent evaporation of the fluid stored in the at least one chamber.

38. A thin film valve control apparatus comprising:
   the thin film valve device of claim 1;
   a spindle motor that rotates the thin film valve device;
   a slider that moves the heat generating apparatus and the permanent magnet, wherein the heat generating apparatus and the permanent magnet are mounted on the slider;
   a slide motor that controls movement of the slider in a radial direction; and
   a central control unit that controls the operation of the heat generating apparatus, the slide motor and the spindle motor and performs a spatial addressing with respect to the thin film valve, wherein the holes in the thin film valve device are selectively opened and closed.

39. The thin film valve control apparatus of claim 38, wherein the heat generating apparatus is selected from the group consisting of a laser beam generating apparatus, a light emitting diode (LED) light source, and a ultraviolet (UV) light source.

40. The thin film valve control apparatus of claim 38, wherein the spatial addressing comprises a radial and azimuthal addressing with respect to the thin film valve.

41. The thin film valve control apparatus of claim 40, wherein once the radial addressing has been completed, the azimuthal addressing with respect to the thin film valve is implemented while a pulse beam or a continuous beam generated from the laser beam generating apparatus is irradiated onto the rotating body.

42. The thin film valve control apparatus of claim 41, further comprising an azimuth angle detector, wherein the pulse beam is generated as the laser beam generating apparatus periodically turns on at an azimuthal position of the thin film valve, which is calculated based on a reference trigger signal obtained by the azimuth angle detector.

43. The thin film valve control apparatus of claim 39, wherein, when the laser beam generating apparatus, which is mounted on the slider, generates a pulse beam or a continuous beam to weaken the adhesive strength of the adhesive after the radial addressing with respect to the thin film valve.

44. The thin film valve control apparatus of claim 38, further comprising:
- a radio frequency generating unit that supplies power to the wireless radio frequency integrated circuit (RFIC); or
- an illuminating unit that supplies light energy to the solar battery.

45. The thin film valve control apparatus of claim 38, wherein the central control unit wirelessly receives an ID of the thin film valve device that is transmitted from the wireless RFIC when the thin film valve device is loaded onto the thin film valve control apparatuses, and recognizes a currently loaded disc as a thin film valve device.

46. The thin film valve control apparatus of claim 38, further comprising an input/output device that complies with a communication standard of a universal serial bus (USB), IEEE1394, ATAPI, SCSI, IDE or a wired/wireless Internet connection.

* * * * *

UNITED STATES PATENT AND TRADEMARK OFFICE
CERTIFICATE OF CORRECTION

PATENT NO. : 8,658,113 B2
APPLICATION NO. : 12/743933
DATED : February 25, 2014
INVENTOR(S) : Yoo It is certified that error appears in the above-identified patent and that said Letters Patent is hereby corrected as shown below:

In the Claims

Column 24, Lines 23-24, in Claim 36, delete "poly-ethyelene," and insert -- polyethylene, --, therefor.

Signed and Sealed this
Twenty-ninth Day of July, 2014

Michelle K. Lee
*Deputy Director of the United States Patent and Trademark Office*